(12) United States Patent
Zhang et al.

(10) Patent No.: US 12,413,038 B2
(45) Date of Patent: Sep. 9, 2025

(54) OPTICAL AMPLIFIER, OPTICAL SIGNAL PROCESSING METHOD, AND STORAGE MEDIUM

(71) Applicant: Huawei Technologies Co., Ltd., Shenzhen (CN)

(72) Inventors: Kai Zhang, Chengdu (CN); Bo Wu, Chengdu (CN); Ning Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 773 days.

(21) Appl. No.: 17/827,224

(22) Filed: May 27, 2022

(65) Prior Publication Data

US 2022/0294171 A1  Sep. 15, 2022

Related U.S. Application Data

(63) Continuation of application No. PCT/CN2020/100848, filed on Jul. 8, 2020.

(30) Foreign Application Priority Data

Nov. 29, 2019  (CN) .......................... 201911203051.3

(51) Int. Cl.
*H01S 3/067* (2006.01)
*H01S 3/10* (2006.01)
(Continued)

(52) U.S. Cl.
CPC ...... *H01S 3/06754* (2013.01); *H01S 3/10015* (2013.01); *H01S 3/13013* (2019.08); *H01S 2301/04* (2013.01); *H04B 10/2941* (2013.01)

(58) Field of Classification Search
None
See application file for complete search history.

(56) References Cited

U.S. PATENT DOCUMENTS 6,671,085 B2 *  12/2003  So ......................... H01S 3/1003
                                                    359/341.41
8,873,135 B2 *  10/2014  Sridhar .............. H04B 10/2916
                                                    359/341.44
(Continued)

FOREIGN PATENT DOCUMENTS

CN           1653376 A    8/2005
CN         101719796 A    6/2010
(Continued)

OTHER PUBLICATIONS

Gao bin, "Research and Design on a New Type of ROADM Technology," 2014, 2 pages (abstract).
(Continued)

*Primary Examiner* — Eric L Bolda
(74) *Attorney, Agent, or Firm* — Conley Rose, P.C.

(57) ABSTRACT

An optical amplifier includes at least two stages of optical amplifier systems, an optical switch, a dynamic gain equalizer (DGE), and a control circuit. An input end of the optical switch is separately coupled to an output end of a first-stage optical amplifier system and an output end of a second-stage optical amplifier system, and an output end of the optical switch is separately coupled to an input end of the second-stage optical amplifier system and an input end of the DGE. The optical switch is configured to set at least two gain modes of the optical amplifier. The control circuit is configured to adjust an attenuation spectrum of the DGE based on the at least two gain modes set by the optical switch. The DGE is configured to perform, based on an adjusted attenuation spectrum, power attenuation processing on signals of different wavelengths in a received optical signal.

20 Claims, 15 Drawing Sheets

(51) Int. Cl.
*H01S 3/13* (2006.01)
*H04B 10/294* (2013.01)

(56) References Cited

U.S. PATENT DOCUMENTS

| | | |
|---|---|---|
| 2002/0041432 A1 | 4/2002 | Onaka et al. |
| 2003/0081892 A1 | 5/2003 | Ghera et al. |
| 2005/0094252 A1 | 5/2005 | Haggans et al. |
| 2005/0110942 A1 | 5/2005 | Ide |
| 2009/0174931 A1 | 7/2009 | Huber et al. |
| 2012/0141121 A1 | 6/2012 | Itoh et al. |
| 2012/0321300 A1 | 12/2012 | Sueoka |
| 2014/0177037 A1 | 6/2014 | Sridhar et al. |
| 2015/0180196 A1 | 6/2015 | Wang et al. |
| 2016/0192043 A1* | 6/2016 | Shukunami ......... H01S 3/13013 398/45 |

FOREIGN PATENT DOCUMENTS

| | | |
|---|---|---|
| CN | 102845000 A | 12/2012 |
| CN | 110061407 A | 7/2019 |
| EP | 2887567 A1 | 6/2015 |
| JP | 2000252923 A | 9/2000 |
| JP | 20150128157 A | 7/2015 |
| WO | 0246835 A2 | 6/2002 |

OTHER PUBLICATIONS

H. Ono, et al., "An erbium-doped fibre amplifier with widely variable gain employing integrated components on a planar lightwave circuit," 37th European Conference and Exhibition on Optical Communication, 2011, 3 pages.

* cited by examiner

OPTICAL AMPLIFIER, OPTICAL SIGNAL PROCESSING METHOD, AND STORAGE MEDIUM

CROSS-REFERENCE TO RELATED APPLICATIONS

This is a continuation of International Patent Application No. PCT/CN2020/100848 filed on Jul. 8, 2020, which claims priority to Chinese Patent Application No. 201911203051.3 filed on Nov. 29, 2019. The disclosures of the aforementioned applications are hereby incorporated by reference in their entireties.

TECHNICAL FIELD

This application relates to the field of optical fiber communication technologies, and in particular, to an optical amplifier, an optical signal processing method, and a storage medium.

BACKGROUND

An optical amplifier is one of most important devices in an optical fiber transmission link. As a repeater, the optical amplifier is configured to compensate for a power loss suffered by an optical signal during transmission in the optical fiber transmission link. However, optical amplifiers with different gains are needed for optical fiber transmission links with different spans due to different optical cable lengths, differences in performance of passive components, and the like in optical networks.

FIG. 1 is a schematic diagram of a structure of an optical amplifier of two stages of optical amplifier units. As shown in FIG. 1, the optical amplifier includes the two stages of optical amplifier units, a gain equalizer, and a variable optical attenuator (VOA). Each stage of optical amplifier unit includes an input/output port, an optical isolator (ISO), a wavelength division multiplexer (WDM), a pump laser, and an erbium-doped optical fiber (EDF). A length of the EDF physically determines a maximum value and a minimum value of a gain interval of each stage of optical amplifier unit. An optical signal-to-noise ratio (OSNR) of an intermediate-stage optical fiber transmission link of the optical amplifier may be changed by adjusting an attenuation value of the VOA. However, because transmission of different optical services has a minimum OSNR requirement, noise figure (NF) performance of the optical amplifier limits a dynamic range of the optical amplifier (namely, a range of an adjustable gain of the optical amplifier). Generally, a larger dynamic range indicates that the optical amplifier can cope with more link loss scenarios. Therefore, when the dynamic range is larger, the NF performance of the optical amplifier inevitably deteriorates.

FIG. 2 is an optical amplifier that alleviates an NF performance deterioration problem of the optical amplifier in FIG. 1. As shown in FIG. 2, the improved optical amplifier includes four stages of optical amplifier units (a first-stage optical amplifier unit to a fourth-stage optical amplifier unit). Among the four stages of optical amplifier units, a quantity and a sequence of optical amplifier units through which an optical signal passes are controlled by using four optical switches (a first optical switch to a fourth optical switch). For a specific connection relationship, refer to FIG. 2, and different optical switches may be adjusted so that the improved optical amplifier has different gain ranges.

However, the improved optical amplifier still has problems of NF performance deterioration and relatively high implementation costs. In addition, because only one of multi-stage amplification modes can be considered in a design process of gain flattening filters (GFFs) in all stages of optical amplifier units, gain spectra of all stages of optical amplifier units cannot be perfectly matched. This results in degradation of flatness performance.

SUMMARY

Embodiments of this application provide an optical amplifier, an optical signal processing method, and a storage medium, to resolve problems of NF performance deterioration, relatively high implementation costs, and low flatness performance that exist in an existing optical amplifier.

According to a first aspect, this application provides an optical amplifier, including at least two stages of optical amplifier units, an optical switch, a dynamic gain equalizer (DGE), and a control circuit. The at least two stages of optical amplifier units include a first-stage optical amplifier unit and a second-stage optical amplifier unit.

An input end of the optical switch is separately connected to an output end of the first-stage optical amplifier unit and an output end of the second-stage optical amplifier unit, and an output end of the optical switch is separately connected to an input end of the second-stage optical amplifier unit and an input end of the DGE.

The optical switch is configured to set at least two gain modes of the optical amplifier, where amplification multiples of the optical amplifier are different when the optical amplifier is in different gain modes.

The first-stage optical amplifier unit is configured to amplify an input optical signal of the optical amplifier, and the second-stage optical amplifier unit is configured to amplify a first optical signal output by the optical switch.

The control circuit is separately connected to the optical switch and the DGE, and the control circuit is configured to control the optical switch to set the at least two gain modes, and adjust an attenuation spectrum of the DGE based on the at least two gain modes set by the optical switch.

The DGE is configured to perform, based on an adjusted attenuation spectrum, power attenuation processing on signals of different wavelengths in a second optical signal output by the optical switch.

According to a second aspect, this application provides an optical amplifier, including at least two stages of optical amplifier units, an optical switch, a DGE, and a control circuit. The at least two stages of optical amplifier units include a first-stage optical amplifier unit and a second-stage optical amplifier unit.

The DGE is disposed between an output end of the first-stage optical amplifier unit and an input end of the optical switch, and an output end of the optical switch is connected to an input end of the second-stage optical amplifier unit.

The optical switch is configured to set at least two gain modes of the optical amplifier, where amplification multiples of the optical amplifier are different when the optical amplifier is in different gain modes.

The first-stage optical amplifier unit is configured to amplify an input optical signal of the optical amplifier, and the second-stage optical amplifier unit is configured to amplify a first optical signal output by the optical switch.

The control circuit is separately connected to the optical switch and the DGE, and the control circuit is configured to control the optical switch to set the at least two gain modes, and adjust an attenuation spectrum of the DGE based on the at least two gain modes set by the optical switch.

The DGE is configured to perform, based on an adjusted attenuation spectrum, power attenuation processing on signals of different wavelengths in an optical signal output by the first-stage optical amplifier unit.

According to a third aspect, this application provides an optical signal processing method, applied to an optical amplifier. The optical amplifier includes at least two stages of optical amplifier units, an optical switch, a DGE, and a control circuit, and the at least two stages of optical amplifier units include a first-stage optical amplifier unit and a second-stage optical amplifier unit. An input end of the optical switch is separately connected to an output end of the first-stage optical amplifier unit and an output end of the second-stage optical amplifier unit, and an output end of the optical switch is separately connected to an input end of the second-stage optical amplifier unit and an input end of the DGE. The control circuit is separately connected to the optical switch and the DGE.

The method includes obtaining a system configuration instruction, where the system configuration instruction includes a gain range of the optical amplifier, controlling, based on the gain range of the optical amplifier, the optical switch to set at least two gain modes and a working status of each of the at least two stages of optical amplifier units, where the first-stage optical amplifier unit is configured to amplify an input optical signal of the optical amplifier, and the second-stage optical amplifier unit is configured to amplify a first optical signal output by the optical switch, adjusting an attenuation spectrum of the DGE based on the at least two gain modes set by the optical switch, and controlling the DGE to perform, based on an adjusted attenuation spectrum, power attenuation processing on signals of different wavelengths in a second optical signal output by the optical switch.

According to a fourth aspect, this application provides an optical signal processing method, applied to an optical amplifier. The optical amplifier includes at least two stages of optical amplifier units, an optical switch, a DGE, and a control circuit, and the at least two stages of optical amplifier units include a first-stage optical amplifier unit and a second-stage optical amplifier unit. The DGE is disposed between an output end of the first-stage optical amplifier unit and an input end of the optical switch, and an output end of the optical switch is connected to an input end of the second-stage optical amplifier unit. The control circuit is separately connected to the optical switch and the DGE.

The method includes obtaining a system configuration instruction, where the system configuration instruction includes a gain range of the optical amplifier, controlling, based on the gain range of the optical amplifier, the optical switch to set at least two gain modes and a working status of each of the at least two stages of optical amplifier units, where the first-stage optical amplifier unit is configured to amplify an input optical signal of the optical amplifier, and the second-stage optical amplifier unit is configured to amplify a first optical signal output by the optical switch, adjusting an attenuation spectrum of the DGE based on the at least two gain modes set by the optical switch, and controlling the DGE to perform, based on an adjusted attenuation spectrum, power attenuation processing on signals of different wavelengths in an optical signal output by the first-stage optical amplifier unit.

According to a fifth aspect, this application provides a computer-readable storage medium. The computer-readable storage medium stores instructions, and when the instructions are run on a computer, the computer is enabled to perform the method according to the third aspect and the possible implementations.

According to a sixth aspect, this application provides a computer-readable storage medium. The computer-readable storage medium stores instructions, and when the instructions are run on a computer, the computer is enabled to perform the method according to the fourth aspect and the possible implementations.

DESCRIPTION OF EMBODIMENTS

With continuous development of information society and continuous emergence of high-definition video, virtual reality (VR)/augmented reality (AR), and Internet of things (IoT) services, optical fiber communication, as one of most important means of communication, carries most of network traffic. As a repeater, an optical amplifier is one of most important devices in an optical fiber transmission link, and is configured to compensate for a power loss suffered by an optical signal during link transmission. Optical amplifiers with different gains are provided for optical fiber transmission links with different spans due to different optical cable lengths, differences in performance of passive components, and the like in optical networks.

Figure 1:
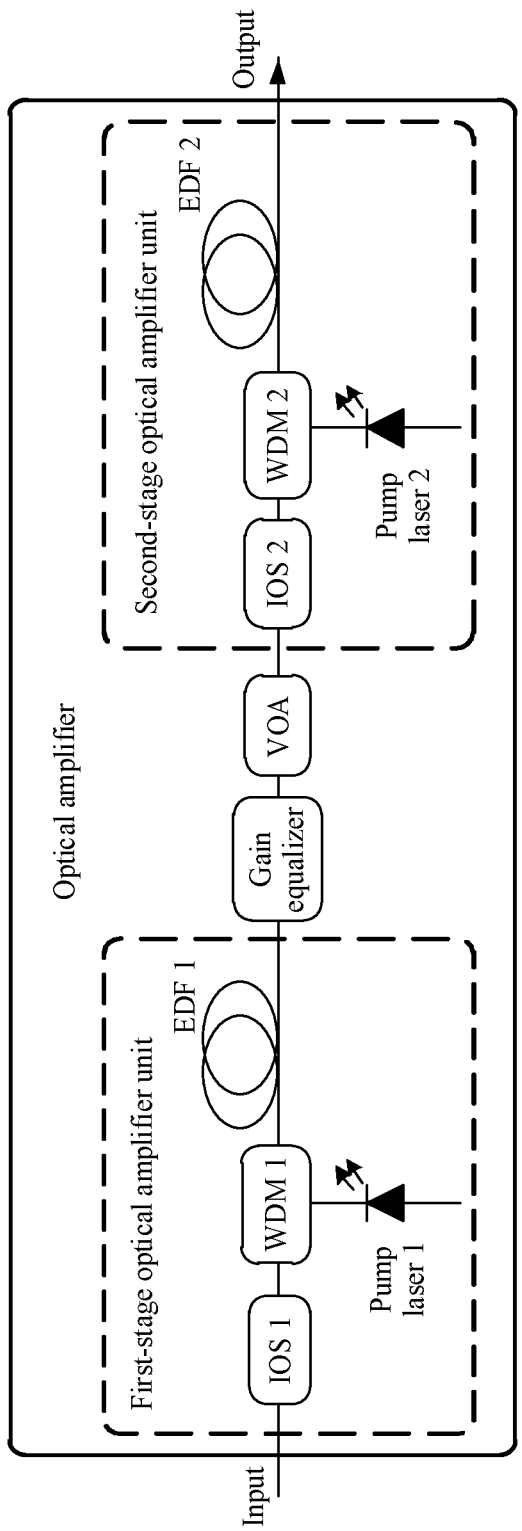
FIG. 1 is a schematic diagram of a structure of a conventional optical amplifier of two stages of optical amplifier units.
Figure 2:
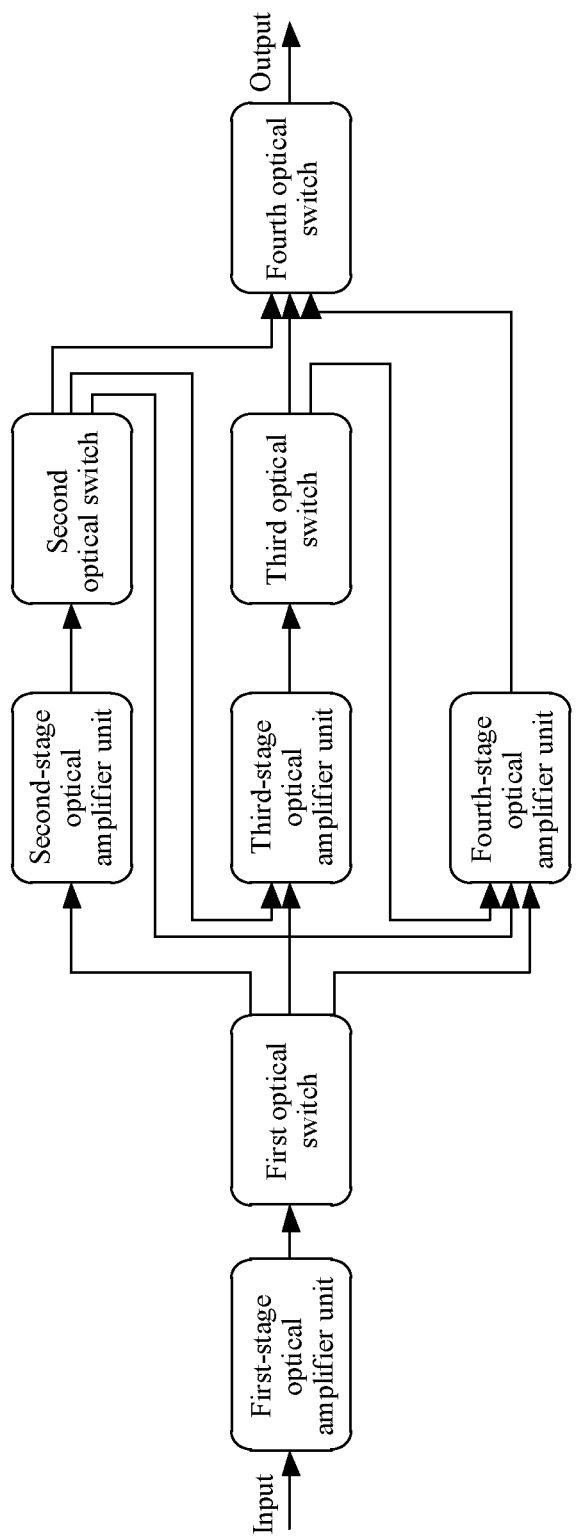
FIG. 2 is an optical amplifier that alleviates an NF performance deterioration problem of the optical amplifier in FIG. 1.

In practical application, a two-stage optical amplifier is an optical amplifier having two stages of optical amplifier units. FIG. 1 shows an optical amplifier of two stages of optical amplifier units. For a two-stage optical amplifier, an intermediate stage may be defined as a general term of components between two optical amplifier units, and mainly includes a gain equalizer and a VOA. Each component has an inherent loss due to a physical characteristic, an implementation, and the like of the component. That is, a power loss occurs after an optical signal passes through the component. Such an inherent loss is referred to as an insertion loss (IL). An intermediate-stage insertion loss represents an optical power loss caused by the gain equalizer and the VOA, including an inherent insertion loss of the gain equalizer, an inherent insertion loss of the VOA, a set attenuation value of the VOA, and the like.

Currently, a full name of the gain equalizer used in the two-stage optical amplifier is a GFF. The gain equalizer is manufactured by using a multilayer film technology, and an attenuation spectrum of the gain equalizer is fixed and cannot be adjusted. The gain equalizer matches an amplification spectrum of an EDF, that is, adjusts attenuation of different wavelengths, to ensure that output optical signal power of the optical amplifier is flat. In the two-stage optical amplifier, the gain equalizer is located between two stages of optical amplifier units, that is, at the intermediate stage.

In practical application, a higher intermediate-stage insertion loss of the optical amplifier leads to a higher NF, thereby affecting an OSNR of an optical transmission link. Because transmission of different optical services has a minimum OSNR requirement, a requirement on NF performance of the optical amplifier limits a dynamic range of the optical amplifier, namely, a range of an adjustable gain of the optical amplifier. A larger dynamic range indicates that the optical amplifier can cope with more link loss scenarios. Application of an optical amplifier with a large dynamic range can reduce types of optical amplifiers provided in a link. In a metropolitan scenario or an inter-data center interconnection scenario, the optical amplifier with a large dynamic range has a potentiality to implement "normalization" of optical amplifiers, to reduce deployment, control, and maintenance costs.

An NF value of the optical amplifier is defined as a value obtained by subtracting an OSNR value before an optical signal passes through the optical amplifier from an OSNR value after the optical signal passes through the optical amplifier. Therefore, the NF performance directly affects OSNR performance of the optical signal. The OSNR performance of the optical signal directly reflects quality of the optical signal. To ensure that received signal quality (bit error rate) reaches a standard, it is necessary to ensure that an OSNR value of the optical signal at a receive end is not less than a set target value. Therefore, limited by the target OSNR value, the NF value may be as low as possible. For an existing optical amplifier, a gain of the optical amplifier is changed by adjusting a VOA, and a higher intermediate-stage insertion loss leads to severer NF performance deterioration.

In view of a problem of NF performance deterioration in the existing optical amplifier, embodiments of this application provide an optical amplifier. The optical amplifier includes at least two stages of optical amplifier units, an optical switch, a DGE, and a control circuit, and the at least two stages of optical amplifier units include a first-stage optical amplifier unit and a second-stage optical amplifier unit. In a design, an input end of the optical switch is separately connected to an output end of the first-stage optical amplifier unit and an output end of the second-stage optical amplifier unit, and an output end of the optical switch is separately connected to an input end of the second-stage optical amplifier unit and an input end of the DGE. In another design, the DGE is disposed between the output end of the first-stage optical amplifier unit and the input end of the optical switch, and the output end of the optical switch is connected to the input end of the second-stage optical amplifier unit. In the foregoing two designs, the optical switch is configured to set at least two gain modes of the optical amplifier, the first-stage optical amplifier unit is configured to amplify an input optical signal of the optical amplifier, and the second-stage optical amplifier unit is configured to amplify a first optical signal output by the optical switch, the control circuit is separately connected to the optical switch and the DGE, and the control circuit is configured to adjust an attenuation spectrum of the DGE based on the at least two gain modes set by the optical switch, and the DGE is configured to perform, based on an adjusted attenuation spectrum, power attenuation processing on signals of different wavelengths in a received optical signal. In this technical solution, the gain mode is switched by using the optical switch, and gain adjustment is performed by using the DGE whose attenuation spectrum is adjustable, that is, by changing an attenuation spectrum of a GFF. In this way, an inherent insertion loss of an intermediate stage of the optical amplifier is not increased, and better NF performance is obtained.

Further, if an NF is lower, a gain interval range of the optical amplifier can be extended. When a total dynamic range remains unchanged, the gain modes can be reduced, and control complexity of the optical switch can be reduced. In addition, the optical amplifier designs proposed in the embodiments of this application can enable a plurality of gain modes to share the DGE, thereby simplifying a structural design of the optical amplifier, and reducing difficulty in designing a dynamic GFF.

In the embodiments of this application, the DGE is used to replace the GFF and the VOA in the optical amplifier. Although inherent insertion losses are similar, in a gain adjustment process, the DGE implements matching with a gain spectrum of an optical amplifier unit by adjusting an attenuation spectrum of a gain filter, so that flatness of the output optical signal power of the optical amplifier is improved.

In practical application, the optical amplifier provided in the embodiments of this application implements normalization of optical amplifiers in a metropolitan optical network or an inter-data center optical fiber communication link, thereby reducing device costs and operation and maintenance costs, and improving end-to-end transmission performance of the link.

Figure 3:
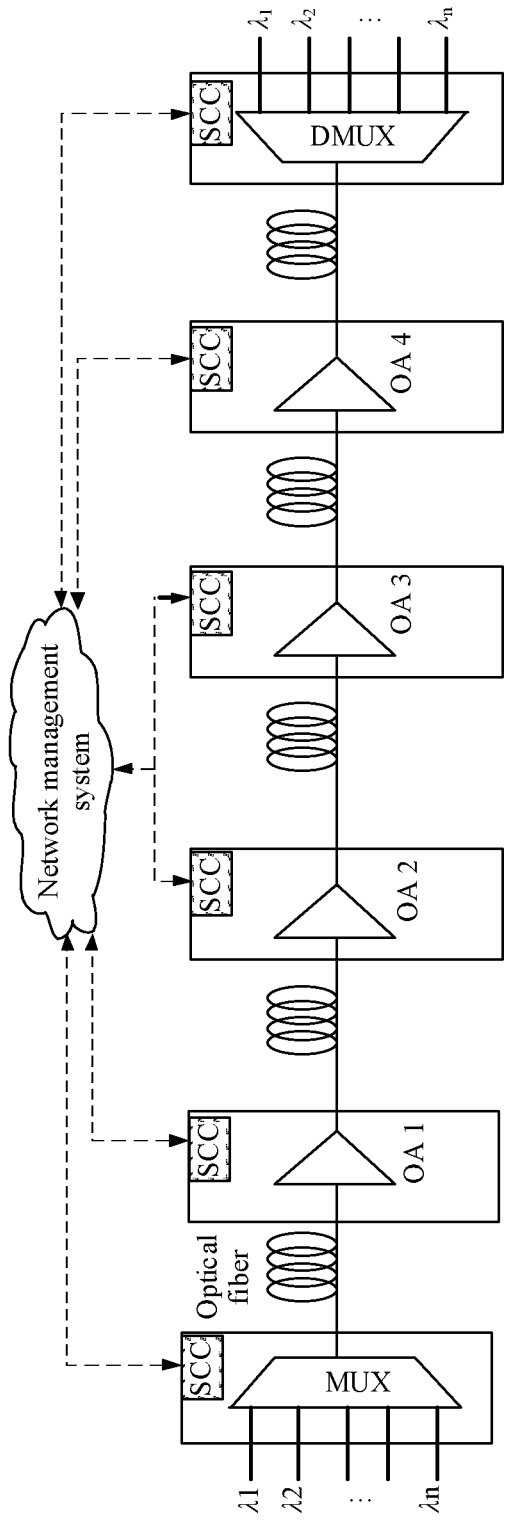
FIG. 3 is a schematic diagram of an architecture of an optical communication system according to an embodiment of this application.

For example, FIG. 3 is a schematic diagram of an architecture of an optical communication system according to an embodiment of this application. Refer to FIG. 3. The optical communication system may include a multiplexer (MUX) 31, a demultiplexer (DMUX) 32, and a plurality of optical amplifiers (OAs). For example, in the schematic diagram shown in FIG. 3, four optical amplifiers are used as an example for description, and the optical amplifiers are respectively an OA 1 to an OA 4. It may be understood that, in practical application, a quantity of optical amplifiers in the optical communication system is not limited, and may be set based on an actual requirement.

Refer to FIG. 3. The optical amplifier is used as an important component in an optical network, and is configured to compensate for a power loss of an optical signal during transmission, so that a distance of transmission without a relay can be improved. Optionally, optical signals with different wavelengths may form a wavelength division multiplexing signal by using the MUX 31, and after the wavelength division multiplexing signal passes through several optical fibers 33 and a plurality of optical amplifiers, the wavelength division multiplexing signal is split by using the DMUX 32, to obtain optical signals with a plurality of different wavelengths.

For example, in this embodiment of this application, different devices in the optical network communicate with an external network management system by using system control and communication boards (SCCs) in the devices, to achieve a purpose of controlling the devices by using the network management system.

Optionally, the network management system in this embodiment may be a control device in the optical communication system, or may be an external control device. Specific implementation of the network management system may be set based on an actual requirement, and details are not described herein.

It should be noted that, in this embodiment of this application, types and quantities of components included in the optical communication system are not limited. For example, the optical communication system may further include components such as an optical coupler, a photoelectric detector, and an optical monitor. Types and quantities of specific components included in the optical communication system may be set based on an actual scenario. Details are not described herein.

The optical amplifier provided in the embodiments of this application may be any optical amplifier in the optical communication system shown in FIG. 3. For composition and an implementation principle of the optical amplifier, refer to descriptions in the following embodiments.

Optionally, before technical solutions of this application are described, function principles of a plurality of components that may be used in this application are first described.

Optical coupler distributes optical power to different ports or couples optical power to optical fibers in a specific proportion. For example, the optical coupler in this embodiment may be a fused-tapered fiber coupler or a micro optical element coupler.

Photoelectric detector converts an optical signal into an electrical signal, and obtains power of the optical signal.

Optical monitor monitors parameters such as power and an OSNR of an output signal of the optical amplifier by using an optical monitoring (MON) port.

Control circuit of the optical amplifier collects information from the photoelectric detector and an optical monitoring module, and controls response of the DGE, a setting of the optical switch, and pump laser power of the optical amplifier unit.

In the embodiments of this application, the optical amplifier has different power ranges of input optical signals, different gain ranges, different saturated output power, different noise coefficients, and different wavelength ranges. Main compositional structures of the optical amplifier include an ISO, a pump laser, an optical WDM, and an EDF.

ISO restricts an optical signal to traveling in a specific direction.

Pump laser generates pump laser light of a specific wavelength.

Optical WDM couples signal light and pump light to a same optical fiber.

EDF is manufactured by doping a rare-earth element erbium in a silicon dioxide optical fiber. An optical signal and pump light enter the EDF together. Erbium ions absorb the pump light and transition to a high energy level to form particles, stimulated radiation occurs after inversion, and the optical signal is amplified. A signal amplification degree is related to a wavelength of the optical signal, power of the optical signal, a length of the EDF, a physical parameter of the EDF, power of the pump light, and a wavelength of the pump light.

Specific embodiments are used below to describe in detail the technical solutions of this application. It should be noted that the following several specific embodiments may be combined with each other, and a same or similar concept or process may not be described repeatedly in some embodiments.

Embodiment 1

Figure 4:
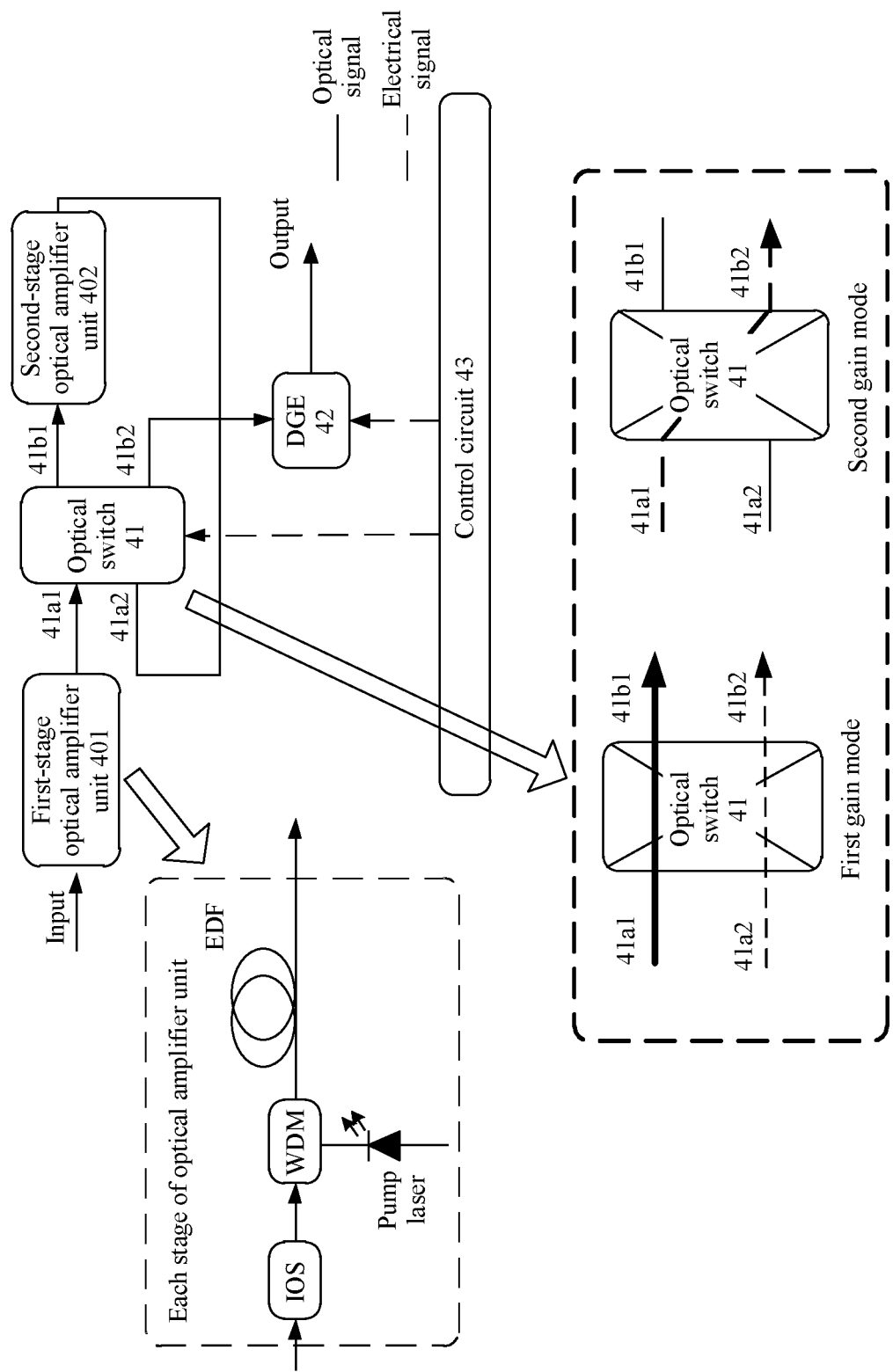
FIG. 4 is a schematic diagram of a structure of an optical amplifier according to an embodiment of this application.

FIG. 4 is a schematic diagram of a structure of an optical amplifier according to an embodiment of this application. As shown in FIG. 4, the optical amplifier includes at least two stages of optical amplifier units, an optical switch 41, a DGE 42, and a control circuit 43. The at least two stages of optical amplifier units include a first-stage optical amplifier unit 401 and a second-stage optical amplifier unit 402.

For example, an input end of the optical switch 41 is separately connected to an output end of the first-stage optical amplifier unit 401 and an output end of the second-stage optical amplifier unit 402, and an output end of the optical switch 41 is separately connected to an input end of the second-stage optical amplifier unit 402 and an input end of the DGE 42.

The optical switch 41 is configured to set at least two gain modes of the optical amplifier, where amplification multiples of the optical amplifier are different when the optical amplifier is in different gain modes. The first-stage optical amplifier unit 401 is configured to amplify an input optical signal of the optical amplifier, and the second-stage optical amplifier unit 402 is configured to amplify a first optical signal output by the optical switch 41.

Refer to FIG. 4. The control circuit 43 is separately connected to the optical switch 41 and the DGE 42, and the control circuit 43 is configured to control the optical switch 41 to set the at least two gain modes, and adjust an attenuation spectrum of the DGE 42 based on the at least two gain modes set by the optical switch 41.

The DGE 42 is configured to perform, based on an adjusted attenuation spectrum, power attenuation processing on signals of different wavelengths in a second optical signal output by the optical switch 41.

Optionally, refer to FIG. 4. Each stage of optical amplifier unit may include an ISO, a WDM, an EDF, a pump laser, and the like. A function and an implementation principle of each component are similar to those of an existing optical amplifier, and details are not described herein.

For example, in this embodiment of this application, it is assumed that an internal circuit of the optical amplifier is divided into a main optical path and branch optical paths. The main optical path is a path through which optical signals are passed, and the branch optical paths are different optical paths through which optical signals pass in different gain modes. Therefore, in this embodiment, the DGE 42 is located on the main optical path, to ensure that the gain modes can share the DGE 42. The optical switch 41 is a connection point between the main optical path and the branch optical paths. Each stage of optical amplifier unit may be disposed on the main optical path or a branch optical path, and a change may be made based on a specific amplification requirement. For example, in the embodiment shown in FIG. 4, the first-stage optical amplifier unit 401 is located on the main optical path, and the second-stage optical amplifier unit 402 is located on a branch optical path.

In this embodiment, the DGE 42 is deployed after the optical switch 41, and under control of the control circuit 43, performs power attenuation processing on signals of different wavelengths in the second optical signal output by the optical switch 41. Response of the DGE 42 is a set of attenuation values of signals of various wavelengths.

For example, the DGE 42 may be implemented in any one of the following plurality of implementations: a liquid crystal (LC), a liquid crystal on silicon (LCOS), a planar lightwave circuit (PLC), a micro-electro-mechanical system (MEMS), and transparent electro-optic ceramics (TEOC).

Optionally, in the optical amplifier provided in this embodiment, the DGE 42 is used to replace a fixed GFF and a VOA in an existing optical amplifier. The DGE 42 may be shared when the optical amplifier is in different gain modes, or different gain modes correspond to different DGEs 42. Compared with the GFF and the VOA, the DGE 42 implements a gain adjustment manner that brings a lower insertion loss, so that performance of the optical amplifier can be improved when a gain is small.

Optionally, the response of the DGE 42 is different in different gain scenarios.

A gain scenario refers to a set working gain value of the amplifier, for example, any working gain value in a range of 19 decibels (dB) to 25 dB. A purpose of the optical amplifier is to compensate for a capability loss suffered by an optical signal during transmission in an optical fiber/optical cable. Attenuation of the optical signal varies with a length of the optical fiber/optical cable. Therefore, a corresponding gain value of the optical amplifier is set. A gain spectrum of the EDF in the optical amplifier varies with the gain value. Therefore, the response of the DGE 42 is changed, to ensure that output optical signal power of the optical amplifier is flat.

In addition, because different gain modes (gain ranges) of the optical amplifier have overlapping gain points, when the attenuation spectrum of the DGE 42 is set, a gain mode in which the optical amplifier works is to be obtained. For example, when a dynamic range of the optical amplifier is 14 dB to 32 dB, a gain range of a first gain mode may be set to 19 dB to 32 dB, and a gain range of a second gain mode may be set to 14 dB to 20 dB.

In this embodiment, a purpose of the attenuation spectrum of the DGE 42 is to match a gain spectrum of each stage of optical amplifier unit in the optical amplifier, to ensure that the output optical signal power of the optical amplifier is flat. Different gain values of the optical amplifier are controlled by a network management system, different gain modes of the optical switch 41 are controlled by the control circuit 43, and the control circuit 43 may further control the attenuation spectrum or the like of the DGE 42 after determining a gain mode of the optical switch 41. The network management system may be software or a program used to control the optical amplifier. A specific implementation of the network management system is not limited herein.

It may be understood that the control circuit 43 may be further connected to each stage of optical amplifier unit. Further, the control circuit 43 is connected to the pump laser in each stage of optical amplifier unit, and is configured to control a working status of the pump laser in each stage of optical amplifier unit after determining the gain mode of the optical switch 41.

In an embodiment of this application, the attenuation spectrum of the DGE 42 may be generated in advance, and correspondences between gain ranges of different gain modes and attenuation spectra of the DGE 42 are preset in the optical amplifier, for example, stored in a form of a table. Therefore, after obtaining a gain range of the optical amplifier and the gain mode of the optical switch, the control circuit 43 may obtain the response of the DGE 42 by using a table lookup method based on the gain ranges of the different gain modes, to control the DGE 42. Because the attenuation spectrum generated in advance matches a rated working dynamic range of the optical amplifier, the gain range of the optical amplifier is not to be exceeded during subsequent use.

For example, the attenuation spectrum of the DGE 42 is essentially a curve of a power attenuation value of an optical signal varying with an optical wavelength. That is, the optical signal has an attenuation value at each wavelength, and power attenuation values corresponding to a plurality of wavelengths form the attenuation spectrum of the DGE 42. In practical application, the attenuation spectrum of the DGE 42 may be stored in the optical amplifier as a configuration file, for example, stored in the control circuit of the optical amplifier, so that the DGE 42 has different response when the optical switch 41 is in different gain modes.

In another embodiment of this application, the control circuit 43 may further control the attenuation spectrum of the DGE 42 in real time based on monitoring data obtained from an optical MON port. That is, the control circuit 43 calculates a difference of a performance parameter such as the output optical signal power/a gain/an OSNR of the optical amplifier, to update and iterate the response of the DGE 42 for a plurality of times until a difference of each performance parameter meets a set threshold requirement. Optionally, a set threshold is preset by the network management system.

In this embodiment of this application, the optical switch 41 is an apparatus that can selectively connect or disconnect an optical signal, or switch from one channel to another channel. The optical switch 41 is mainly implemented by any one of the following optical switches: a MEMS optical switch, an LC optical switch, a waveguide optical switch, a mechanical optical switch, or an electro-optic switch.

It should be noted that when the optical switch 41 has high isolation, an ISO in an adjacent optical amplifier unit may be omitted, or otherwise, the ISO is used. For example, the MEMS optical switch and the mechanical optical switch have high isolation, so that the ISO in the adjacent optical amplifier unit may be omitted.

In the optical amplifier provided in this embodiment of this application, the gain mode of the optical amplifier is set by using the optical switch, and gain adjustment is performed by using the DGE whose attenuation spectrum is adjustable. In this way, an inherent insertion loss of an intermediate stage of the optical amplifier is not increased, and better NF performance is obtained. If an NF is lower, a gain interval range of the optical amplifier can be extended. When a total dynamic range remains unchanged, the gain modes can be reduced, and control complexity of the optical switch can be reduced. In addition, an optical amplifier design in this application can enable a plurality of gain modes to share the DGE, thereby simplifying a structural design of the optical amplifier, and reducing difficulty in designing a dynamic GFF.

For example, in this embodiment, the optical switch 41 includes a first input port 41a1, a second input port 41a2, a first output port 41b1, and a second output port 41b2. The first input port 41a1 is connected to the output end of the first-stage optical amplifier unit 401, the second input port 41a2 is connected to the output end of the second-stage optical amplifier unit 402, the first output port 41b1 is connected to the input end of the second-stage optical amplifier unit 402, the second output port 41b2 is connected to the input end of the DGE 42, and an output end of the DGE 42 is connected to an output port of the optical amplifier.

In this embodiment, the at least two gain modes of the optical amplifier include a first gain mode and a second gain mode.

In a possible design of this application, refer to FIG. 4. When the gain mode of the optical amplifier is the first gain mode, the first input port 41a1 is connected to the first output port 41b1, and the second input port 41a2 is connected to the second output port 41b2, so that the input optical signal of the optical amplifier sequentially flows through the first-stage optical amplifier unit 401, the optical switch 41, the second-stage optical amplifier unit 402, the optical switch 41, and the DGE 42, and then is output.

For example, when the optical amplifier is in the first gain mode, that is, a high gain mode, the optical switch 41 is set to a dual-pass mode. In this case, in the optical switch 41, the first input port 41a1 is connected to the first output port 41b1, and the second input port 41a2 is connected to the second output port 41b2. An optical service signal enters from an input end of the optical amplifier, sequentially passes through the first-stage optical amplifier unit 401, the optical switch 41, the second-stage optical amplifier unit 402, the optical switch 41, and the DGE 42, and is finally output by using the output port of the optical amplifier, so that the optical service signal that enters from the input end of the optical amplifier may be output after being amplified by the first-stage optical amplifier unit 401 and the second-stage optical amplifier unit 402.

In another possible design of this application, refer to FIG. 4. When the gain mode of the optical amplifier is the second gain mode, the first input port 41a1 is connected to the second output port 41b2, so that the input optical signal of the optical amplifier sequentially flows through the first-stage optical amplifier unit 401, the optical switch 41, and the DGE 42, and then is output.

Further, when the optical amplifier is in the second gain mode, that is, a low gain mode, the optical switch 41 is set to a cross-connected mode, so that the first input port 41a1 and the second output port 41b2 of the optical switch 41 are connected. If the second input port 41a2 and the first output port 41b1 of the optical switch 41 are also connected, power of a pump laser in the second-stage optical amplifier unit 402 is reduced, or the pump laser in the second-stage optical amplifier unit 402 is temporarily turned off. In this case, an optical service signal enters from the input end of the optical amplifier, sequentially passes through the first-stage optical amplifier unit 401, the optical switch 41, and the DGE 42, and is finally output by using the output port of the optical amplifier, so that the optical service signal that enters from the input end of the optical amplifier may be output after being amplified by the first-stage optical amplifier unit 401.

In this embodiment, whether the second input port 41a2 and the first output port 41b1 are connected depends on a setting of the optical switch 41. In this embodiment of this application, the second input port 41a2 and the first output port 41b1 are not necessarily connected. However, in consideration of a more general case, when the optical switch 41 is in a cross-connected state, each port is not suspended, and therefore may have a connection relationship.

It may be understood that after the network management system sets the gain mode of the optical amplifier, the network management system performs control by using the control circuit 43. When the optical amplifier is in the second gain mode, the pump laser in the second-stage optical amplifier unit 402 is turned off, so that self-excitation caused by a loop formed in the second-stage optical amplifier unit 402 may be avoided.

In this embodiment, different gain modes of the optical amplifier are set by using the optical switch, and a gain of the optical amplifier is adjusted by using the DGE, so that adjustment of the optical amplifier in a large dynamic range can be implemented, and a design of the optical amplifier is simplified.

Embodiment 2

Figure 5:
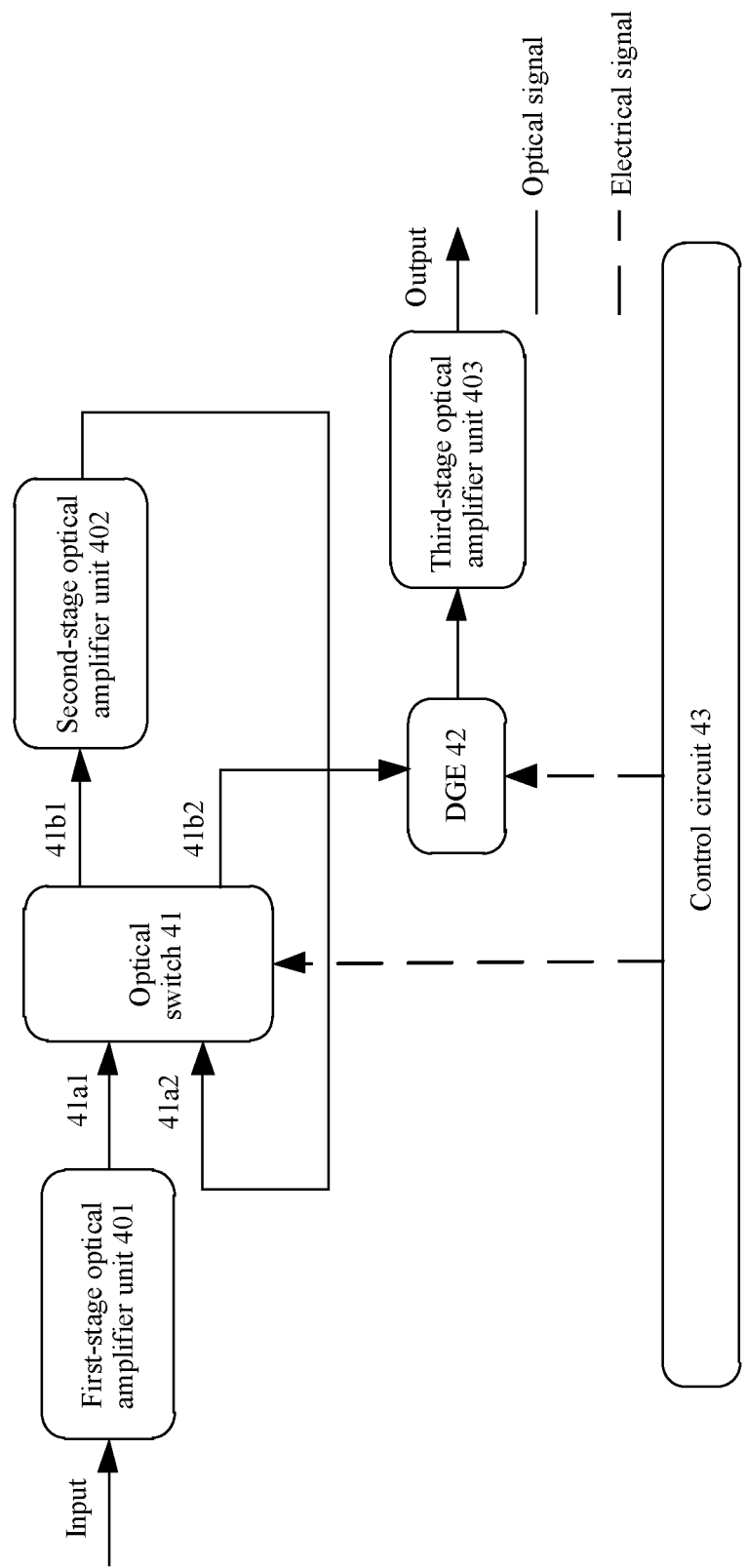
FIG. 5 is another schematic diagram of a structure of an optical amplifier according to an embodiment of this application.

For example, based on the embodiment shown in FIG. 4, FIG. 5 is another schematic diagram of a structure of an optical amplifier according to an embodiment of this application. Refer to FIG. 5. In this embodiment, the at least two stages of optical amplifier units further include a third-stage optical amplifier unit 403 connected between the output end of the DGE 42 and an output end of the optical amplifier.

In this embodiment, one stage of optical amplifier unit (that is, the third-stage optical amplifier unit 403) is further connected after the DGE 42 in the optical amplifier, and the third-stage optical amplifier unit 403 is connected in the main optical path of the optical amplifier. In this case, when the optical amplifier is in different gain modes, a quantity of optical amplifier units through which an optical signal passes is different, that is, the optical amplifier has different gain ranges.

In an example, when the gain mode of the optical amplifier is the first gain mode, the input optical signal of the optical amplifier is output after being amplified by three stages of optical amplifier units including the first-stage optical amplifier unit 401, the second-stage optical amplifier unit 402, and the third-stage optical amplifier unit 403.

In another example, when the gain mode of the optical amplifier is the second gain mode, the input optical signal of the optical amplifier is output after being amplified by two stages of optical amplifier units including the first-stage optical amplifier unit 401 and the third-stage optical amplifier unit 403.

It should be noted that, the optical amplifier provided in this embodiment of this application may alternatively include other quantities of optical switches and/or optical amplifier units, and the gain range of the optical amplifier may be changed by using different quantities of optical switches and/or optical amplifier units. In this embodiment of this application, quantities of optical switches and optical amplifier units are not limited. In practical application, the quantities of optical switches and optical amplifier units may be adjusted based on a dynamic range requirement, and are not limited herein.

In this embodiment, in addition to the ISO, the WDM, the EDF, the pump laser, and the DGE, each stage of optical amplifier unit of the optical amplifier may further include one or more elements such as an optical coupler, a photoelectric detector, an optical switch, and a control circuit. The optical switch switches a combination of optical amplifier units through which an optical signal passes, to form different gain modes, that is, the first gain mode and the second gain mode. Each gain mode corresponds to a specific gain interval. The DGE is used to replace a combination of the GFF and the VOA, so that a gain interval range in each gain mode is greatly extended, and NF performance of the optical amplifier is improved. At least two gain modes share the DGE that replaces a plurality of GFFs in other optical amplifiers, so that difficulty in designing the optical amplifier is reduced.

Further, based on the foregoing embodiments, the control circuit 43 is further configured to adjust the attenuation spectrum of the DGE 42 based on input port data and output port data of the optical amplifier.

In this embodiment of this application, the control circuit 43 may further detect the input port data and the output port data of the optical amplifier, and further dynamically adjust the attenuation spectrum of the DGE 42 based on output optical power distribution of the optical amplifier detected at the MON port. When a case such as a service change occurs, the gain spectrum of the EDF is dynamically matched.

In this embodiment, the optical amplifier uses the optical switch to switch the quantity of optical amplifier units through which an optical signal passes, and can implement a larger dynamic range in combination with the DGE. On one hand, NF performance of the optical amplifier can be improved, and the gain interval of each gain mode can be extended. Compared with an optical amplifier with a same dynamic gain range, this solution has fewer gain modes, thereby reducing costs of the optical amplifier. On the other hand, a DGE sharing manner replaces a plurality of GFFs in other optical amplifiers, thereby simplifying the optical amplifier design.

Embodiment 3

Figure 6:
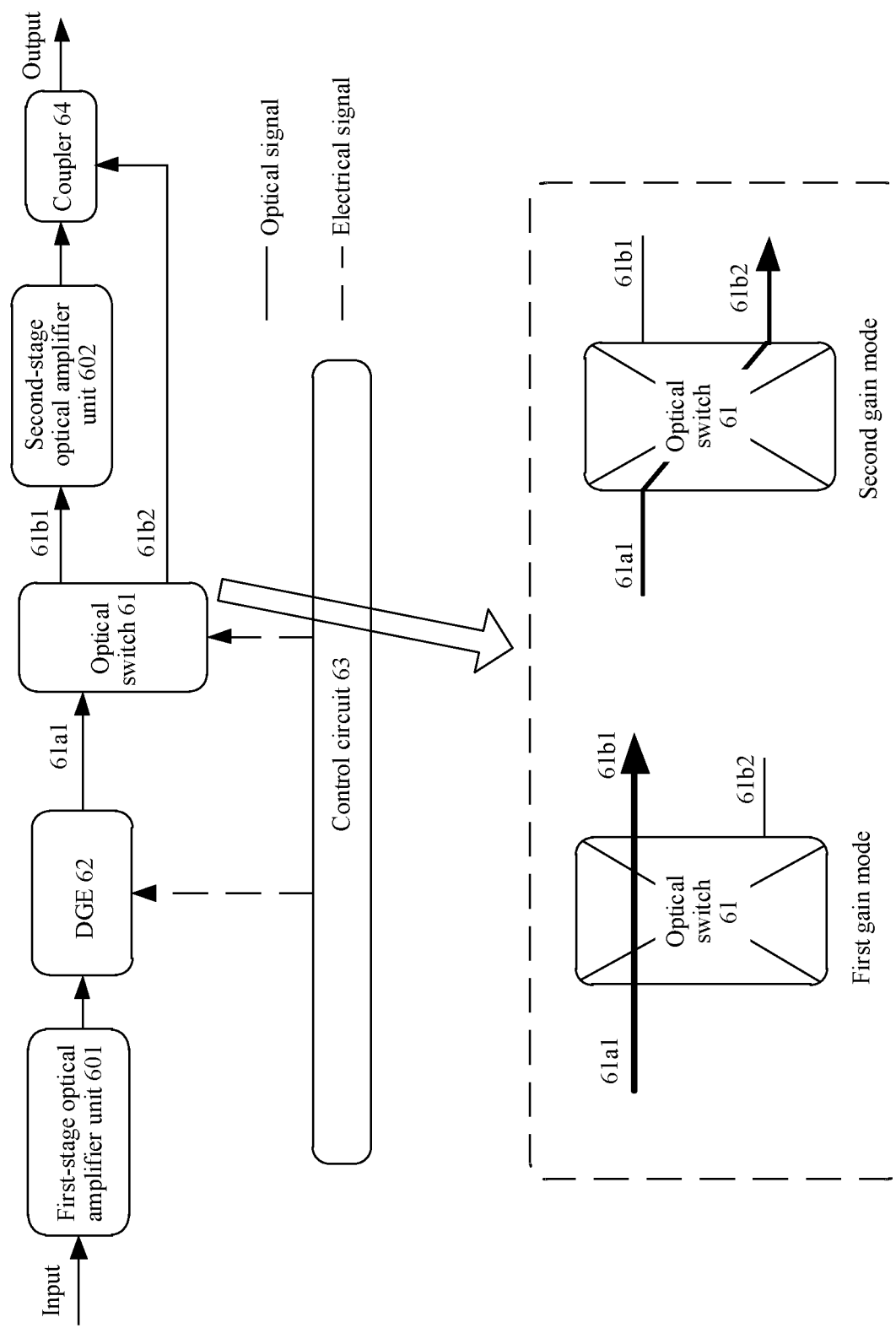
FIG. 6 is still another schematic diagram of a structure of an optical amplifier according to an embodiment of this application.

For example, FIG. 6 is still another schematic diagram of a structure of an optical amplifier according to an embodiment of this application. Refer to FIG. 6. In this embodiment, the optical amplifier may include at least two stages of optical amplifier units, an optical switch 61, a DGE 62, and a control circuit 63. The at least two stages of optical amplifier units include a first-stage optical amplifier unit 601 and a second-stage optical amplifier unit 602.

Refer to FIG. 6. In this embodiment of this application, the DGE 62 is disposed between an output end of the first-stage optical amplifier unit 601 and an input end of the optical switch 61, and an output end of the optical switch 61 is connected to an input end of the second-stage optical amplifier unit 602.

The optical switch 61 is configured to set at least two gain modes of the optical amplifier, where amplification multiples of the optical amplifier are different when the optical amplifier is in different gain modes. The first-stage optical amplifier unit 601 is configured to amplify an input optical signal of the optical amplifier, and the second-stage optical amplifier unit 602 is configured to amplify a first optical signal output by the optical switch 61.

The control circuit 63 is separately connected to the optical switch 61 and the DGE 62, and the control circuit 63 is configured to control the optical switch 61 to set the at least two gain modes, and adjust an attenuation spectrum of the DGE 62 based on the at least two gain modes set by the optical switch 61.

The DGE 62 is configured to perform, based on an adjusted attenuation spectrum, power attenuation processing on signals of different wavelengths in an optical signal output by the first-stage optical amplifier unit 601.

For example, as shown in FIG. 6, the DGE 62 is disposed between the first-stage optical amplifier unit 601 and the optical switch 61, and under control of the control circuit 63 in the optical amplifier, performs power attenuation processing on signals of different wavelengths in the input optical signal, so that response of the DGE 62 is a set of attenuation values of signals of various wavelengths.

It may be understood that components of the optical amplifier provided in this embodiment are similar to components of the optical amplifier shown in FIG. 4, and functions of the components are also the same. For example, similar to the DGE 42 in the embodiment shown in FIG. 4 or FIG. 5, the DGE 62 may be implemented by using any one of the following possible designs: an LC, an LCOS, a PLC, a MEMS, and TEOC.

Similarly, compared with other approaches, the DGE 62 is used to replace a fixed GFF and a VOA in an existing optical amplifier. The DGE 62 may be shared when the optical amplifier is in different gain modes, or different gain modes correspond to different DGEs 62. The response of the DGE 62 is different in different gain scenarios.

In this embodiment, if a quantity of optical amplifier units through which an optical signal that is input at an input end of the optical amplifier passes is different, a total EDF through which the optical signal passes is different. If the total EDF through which the input optical signal of the optical amplifier passes is longer, the optical amplifier can finally implement a higher gain. In this embodiment of this application, for the at least two gain modes of the optical amplifier that are set by the optical switch, a gain value of each gain mode is irrelevant to a name of the gain mode, and is implemented based on different configuration. For example, when the optical amplifier includes a first gain mode and a second gain mode, the two gain modes do not necessarily correspond to high/low.

Optionally, in this embodiment, the attenuation spectrum of the DGE 62 may also be generated in advance. For example, the attenuation spectrum generated in advance is matched with a rated gain range of the optical amplifier. In practical application, the control circuit 63 may obtain the response of DGE 62 based on gain ranges of different gains, and control the response of DGE 62 so that the response of DGE 62 does not exceed the rated gain range.

The control circuit 63 may alternatively perform real-time control based on data of an optical MON port. That is, the control circuit 63 calculates a difference of a performance parameter such as output power/a gain/an OSNR of the optical amplifier, to update the response of the DGE 62 so that a difference of each performance parameter meets a set threshold.

In the optical amplifier provided in this embodiment, the gain mode of the optical amplifier is changed by using the optical switch, that is, a length of the EDF through which the optical signal that is input at the input end of the optical amplifier passes is changed, and a larger dynamic range can be implemented in combination with the DGE. In addition, NF performance and output power flatness of the optical amplifier are improved, a gain interval of each gain mode is extended, gain modes are reduced, and costs of the optical amplifier are reduced. On the other hand, the gain modes share the DGE that replaces a plurality of GFFs in other optical amplifiers, thereby simplifying an optical amplifier design.

For example, in a possible design of this application, there is one optical switch. Refer to FIG. 6. When the optical switch 61 includes a first input port 61a1, a first output port 61b1, and a second output port 61b2, the optical amplifier further includes a coupler 64.

The first input port 61a1 is connected to an output end of the DGE 62, the first output port 61b1 is connected to the input end of the second-stage optical amplifier unit 602, both the second output port 61b2 and an output end of the second-stage optical amplifier unit 602 are connected to the coupler 64, and the coupler 64 is connected to an output port of the optical amplifier.

In this embodiment, when the optical amplifier includes the first-stage optical amplifier unit 601 and the second-stage optical amplifier unit 602, and the optical switch 61 is an optical switch having one input port and two output ports, the coupler 64 is disposed on two output paths of the optical switch 61, to couple two output signals of the optical switch 61. Further, a compositional structure of the optical amplifier is shown in FIG. 6.

In this embodiment, the at least two gain modes of the optical amplifier include a first gain mode and a second gain mode.

Optionally, in an example, when the gain mode of the optical amplifier is the first gain mode, the first input port 61a1 is connected to the first output port 61b1, so that the input optical signal of the optical amplifier sequentially flows through the first-stage optical amplifier unit 601, the DGE 62, the optical switch 61, the second-stage optical amplifier unit 602, and the coupler 64, and then is output.

Optionally, in this embodiment of this application, when the optical amplifier is in the first gain mode, the first input port 61a1 and the first output port 61b1 of the optical switch 61 are connected. An optical service signal enters from the input end of the optical amplifier, sequentially passes through the first-stage optical amplifier unit 601, the DGE 62, the optical switch 61, the second-stage optical amplifier unit 602, and the coupler 64, and is finally output by using the output port of the optical amplifier, so that the optical service signal that enters from the input end of the optical amplifier may be output after being amplified by the first-stage optical amplifier unit 601 and the second-stage optical amplifier unit 602.

In another example, when the gain mode of the optical amplifier is the second gain mode, the first input port 61a1 is connected to the second output port 61b2, so that the input optical signal of the optical amplifier sequentially flows through the first-stage optical amplifier unit 601, the DGE 62, the optical switch 61, and the coupler 64, and then is output.

Optionally, in this embodiment of this application, when the optical amplifier is in the second gain mode, the first input port 61a1 and the second output port 61b2 of the optical switch 61 are connected. An optical service signal enters from the input end of the optical amplifier, sequentially passes through the first-stage optical amplifier unit 601, the DGE 62, the optical switch 61, and the coupler 64, and is finally output by using the output port of the optical amplifier, so that the optical service signal that enters from the input end of the optical amplifier is output after being amplified by the first-stage optical amplifier unit 601.

It may be understood that, as shown in FIG. 6, the second output port 61b2 of the optical switch 61 may be directly connected to the coupler 64, or may be connected to the coupler 64 by using a WDM. That is, an optical signal that is output by the second output port 61b2 of the optical switch 61 may be directly output to the coupler 64, to be output by using the output port of the optical amplifier, or may first undergo wavelength division multiplexing of the WDM and then be output to the coupler 64, to be output by using the output port of the optical amplifier.

A connection mode between the optical switch and the coupler is not limited in this embodiment of this application. The connection mode may be determined based on an actual situation. Details are not described herein.

Embodiment 4

Figure 7:
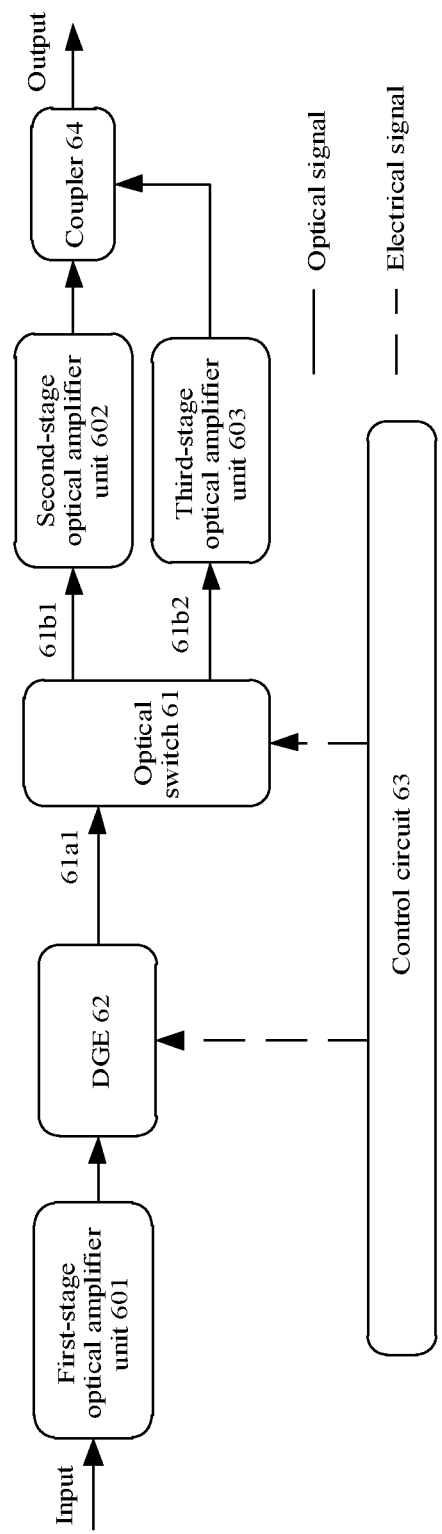
FIG. 7 is yet another schematic diagram of a structure of an optical amplifier according to an embodiment of this application.

For example, based on the embodiment shown in FIG. 6, FIG. 7 is yet another schematic diagram of a structure of an optical amplifier according to an embodiment of this application. Refer to FIG. 7. A third-stage optical amplifier unit 603 may be connected between the second output port 61b2 of the optical switch 61 and the coupler 64. When the first input port 61a1 and the second output port 61b2 of the optical switch 61 are connected, an optical service signal enters from the input end of the optical amplifier, sequentially passes through the first-stage optical amplifier unit 601, the DGE 62, the optical switch 61, the third-stage optical amplifier unit 603, and the coupler 64, and is finally output by using the output port of the optical amplifier, so that the optical service signal that enters from the input end of the optical amplifier may be output after being amplified by the first-stage optical amplifier unit 601 and the third-stage optical amplifier unit 603.

It may be understood that, generally, the second-stage optical amplifier unit 602 and the third-stage optical amplifier unit 603 have different amplification multiples, and the first input port 61a1 of the optical switch 61 may be controlled to connect to different output ports, so that the optical amplifier has different amplification multiples.

Similarly, when the optical switch 61 has three or more output ports, different output ports may be connected to different optical amplifier units, and the different output ports are controlled to be connected to the first input port 61a1, so that the optical amplifier has different amplification multiples.

Embodiment 5

Figure 8:
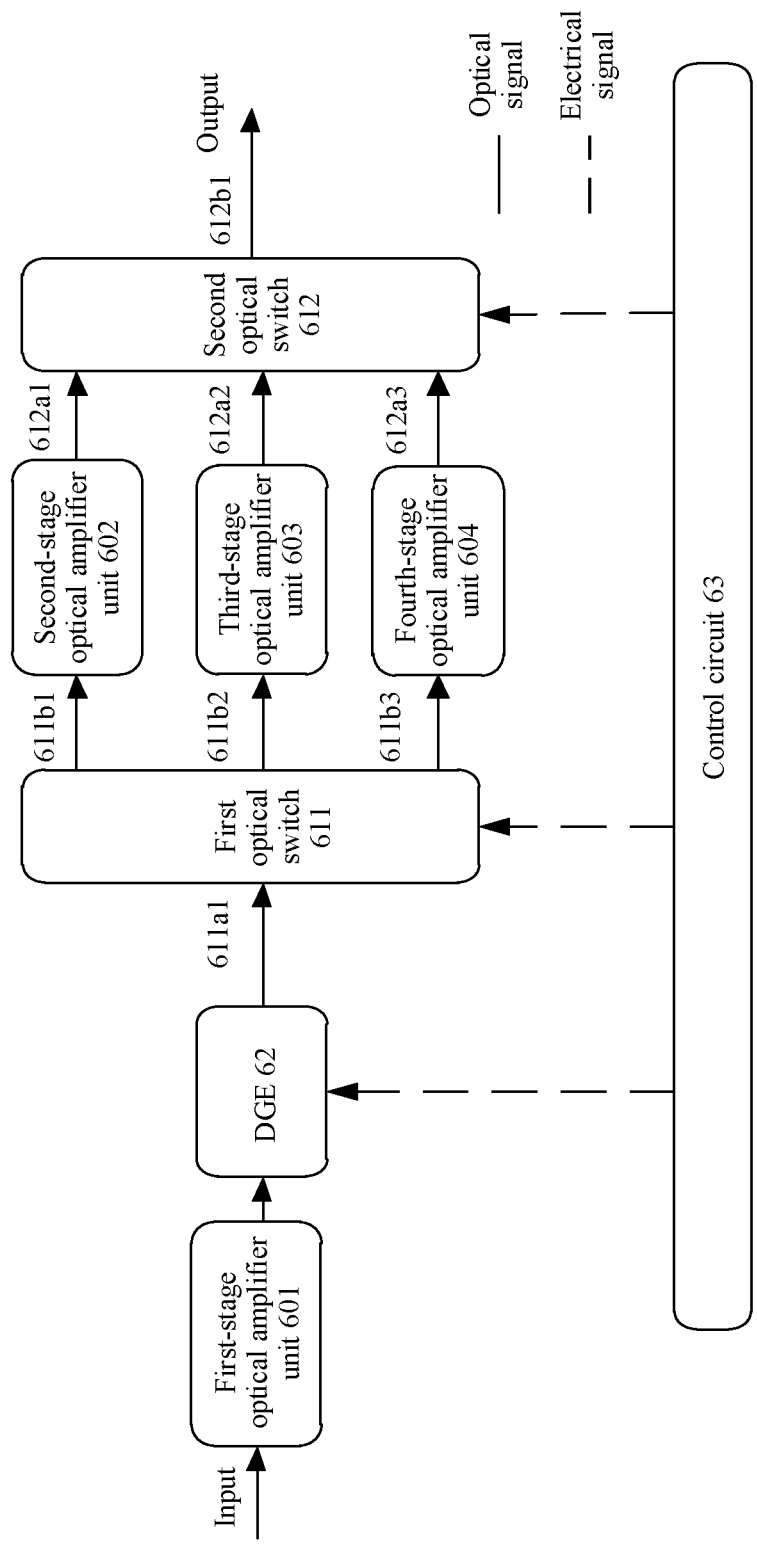
FIG. 8 is yet another schematic diagram of a structure of an optical amplifier according to an embodiment of this application.

For example, FIG. 8 is yet another schematic diagram of a structure of an optical amplifier according to an embodiment of this application. Refer to FIG. 8. In this embodiment, there are four optical amplifier units, which are respectively a first-stage optical amplifier unit 601 to a fourth-stage optical amplifier unit 604. There are two optical switches, which are respectively a first optical switch 611 and a second optical switch 612. The first optical switch 611 is an optical switch having one input port and three output ports. The second optical switch 612 is an optical switch having three input ports and one output port. The first optical switch 611 includes a first input port 611a1, a first output port 611b1, a second output port 611b2, and a third output port 611b3. The second optical switch 612 includes a second input port 612a1, a third input port 612a2, a fourth input port 612a3, and a fourth output port 612b1.

In this embodiment, the first input port 611a1 of the first optical switch 611 is connected to an output end of a DGE 62. The first output port 611b1 of the first optical switch 611 is connected to the second input port 612a1 of the second optical switch 612 by using the second-stage optical amplifier unit 602. The second output port 611b2 of the first optical switch 611 is connected to the third input port 612a2 of the second optical switch 612 by using the third-stage optical amplifier unit 603. The third output port 611b3 of the first optical switch 611 is connected to the fourth input port 612a3 of the second optical switch 612 by using the fourth-stage optical amplifier unit 604. The fourth output port 612b1 of the second optical switch 612 is connected to an output end of the optical amplifier.

For example, when the first input port 611a1 and the first output port 611b1 of the first optical switch 611 are connected, an optical service signal enters from an input end of the optical amplifier, sequentially passes through the first-stage optical amplifier unit 601, the DGE 62, the first optical switch 611, the second-stage optical amplifier unit 602, and the second optical switch 612, and is finally output by using an output port of the optical amplifier, so that the optical service signal that enters from the input end of the optical amplifier may be output after being amplified by the first-stage optical amplifier unit 601 and the second-stage optical amplifier unit 602.

Similarly, when the first input port 611a1 and the second output port 611b2 of the first optical switch 611 are connected, an optical service signal enters from the input end of the optical amplifier, sequentially passes through the first-stage optical amplifier unit 601, the DGE 62, the first optical switch 611, the third-stage optical amplifier unit 603, and the second optical switch 612, and is finally output by using the output port of the optical amplifier, so that the optical service signal that enters from the input end of the optical amplifier may be output after being amplified by the first-stage optical amplifier unit 601 and the third-stage optical amplifier unit 603.

When the first input port 611a1 and the third output port 611b3 of the first optical switch 611 are connected, an optical service signal enters from the input end of the optical amplifier, sequentially passes through the first-stage optical amplifier unit 601, the DGE 62, the first optical switch 611, the fourth-stage optical amplifier unit 604, and the second optical switch 612, and is finally output by using the output port of the optical amplifier, so that the optical service signal that enters from the input end of the optical amplifier may be output after being amplified by the first-stage optical amplifier unit 601 and the fourth-stage optical amplifier unit 604.

It may be understood that, generally, amplification multiples of the second-stage optical amplifier unit to the fourth-stage optical amplifier unit may be different, and a connection relationship between the input ports and the output port of the second optical switch 612 is determined based on a connection relationship between the input port and the output ports of the first optical switch 611, to ensure that an optical signal flowing through the first optical switch 611 may be finally output to the output end of the optical amplifier after passing through the second optical switch 612.

It should be noted that, dimensions (a quantity of input ports and a quantity of output ports) of each optical switch are not limited in this embodiment of this application, provided that an optical signal that is input at the input end of the optical amplifier can be amplified by at least one stage of optical amplifier unit in the optical amplifier and then output by using the output end of the optical amplifier. An amplification multiple of each stage of optical amplifier unit is not limited in this embodiment of this application either. The dimensions of each optical switch and the amplification multiple of each stage of optical amplifier unit may be determined based on an actual situation. Details are not described herein.

Embodiment 6

Figure 9:
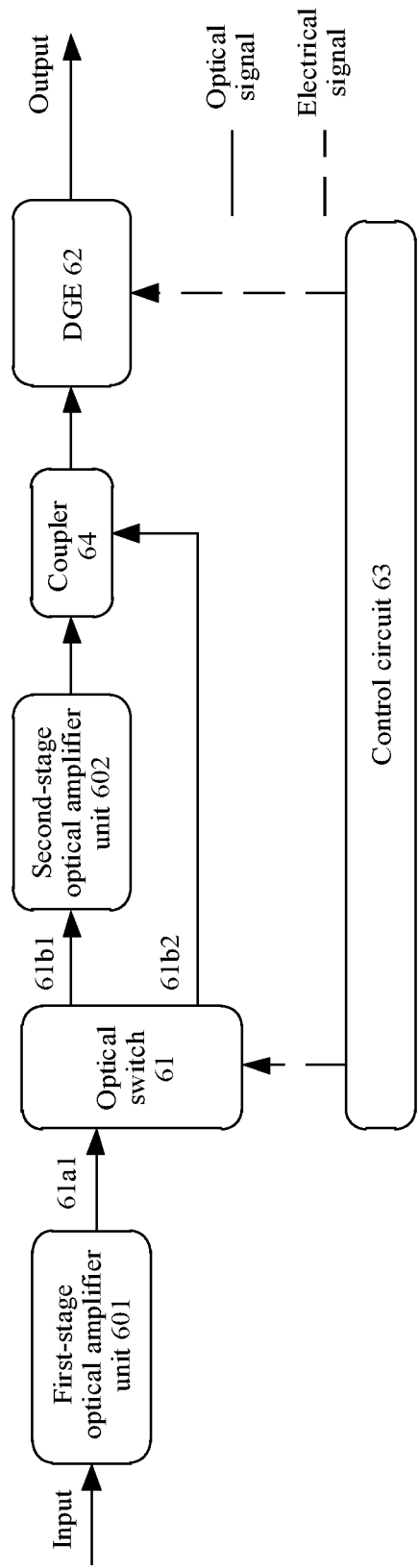
FIG. 9 is yet another schematic diagram of a structure of an optical amplifier according to an embodiment of this application.

Optionally, FIG. 9 is yet another schematic diagram of a structure of an optical amplifier according to an embodiment of this application. Refer to FIG. 9. Components included in the optical amplifier are the same as the components of the optical amplifier shown in FIG. 6. A difference is that, in the optical amplifier shown in FIG. 6, the DGE 62 is disposed between the output end of the first-stage optical amplifier unit 601 and the input end of the optical switch 61, but in the optical amplifier provided in this embodiment, the DGE 62 is disposed at an output end of the coupler 64. Correspondingly, the first input end 61a1 of the optical switch 61 is connected to the output end of the first-stage optical amplifier unit 601.

In the embodiment shown in FIG. 9, implementation principles and technical effects of the optical switch 61, the first-stage optical amplifier unit 601, the second-stage optical amplifier unit 602, and the control circuit 63 are similar to those of the optical amplifier shown in FIG. 6, and details are not described herein.

In addition, in this embodiment, because the DGE 62 is disposed at the output end of the coupler 64, the DGE 62 is configured to perform, based on an adjusted attenuation spectrum, power attenuation processing on signals of different wavelengths in an optical signal output by the coupler 64.

Embodiment 7

Figure 10:
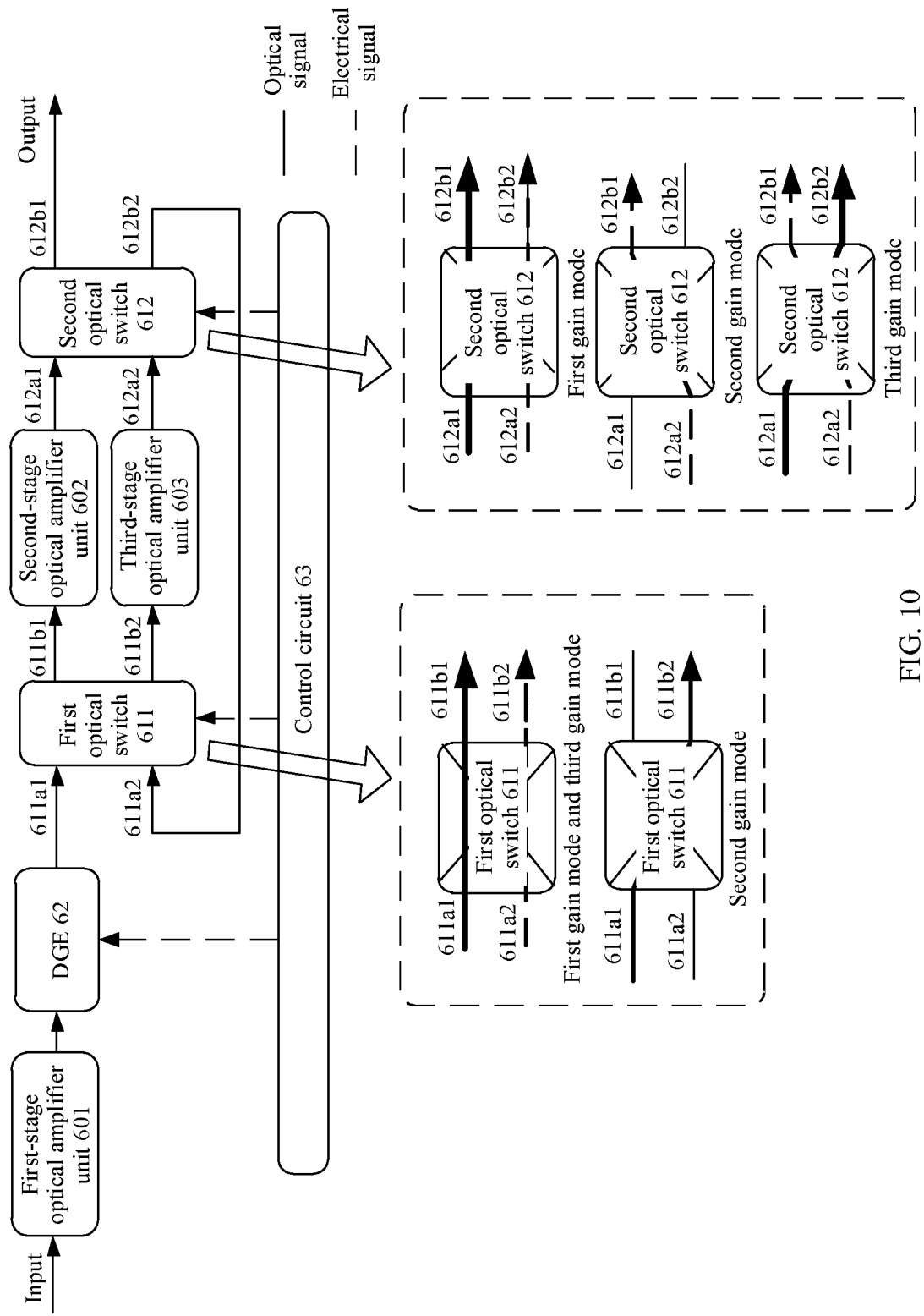
FIG. 10 is yet another schematic diagram of a structure of an optical amplifier according to an embodiment of this application.

For example, based on the embodiment shown in FIG. 6, FIG. 10 is yet another schematic diagram of a structure of an optical amplifier according to an embodiment of this application. Refer to FIG. 10. The at least two stages of optical amplifier units further include a third-stage optical amplifier unit 603. There are two optical switches, and the two optical switches include a first optical switch 611 and a second optical switch 612. The first optical switch 611 includes a first input port 611a1, a second input port 611a2, a first output port 611b1, and a second output port 611b2. The second optical switch 612 includes a third input port 612a1, a fourth input port 612a2, a third output port 612b1, and a fourth output port 612b2.

For the first optical switch 611, the first input port 611a1 is connected to the DGE 62, the first output port 611b1 is connected to the input end of the second-stage optical amplifier unit 602, the second input port 611a2 is connected to the fourth output port 612b2, and the second output port 611b2 is connected to an input end of the third-stage optical amplifier unit 603.

For the second optical switch 612, the third input port 612a1 is connected to the output end of the second-stage optical amplifier unit 602, the fourth input port 612a2 is connected to an output end of the third-stage optical amplifier unit 603, and the third output port 612b1 is connected to the output port of the optical amplifier.

Refer to FIG. 10. In this embodiment of this application, the optical amplifier includes three optical amplifier units, two 2*2 optical switches, the control circuit 63, and the DGE 62. The first optical switch 611 and the second optical switch 612 may switch a combination of optical amplifier units through which the input optical signal of the optical amplifier passes, to form different gain modes, for example, the first gain mode, the second gain mode, and a third gain mode. Each gain mode corresponds to a specific gain interval. Gain modes share the DGE 62, so that a gain interval range is greatly extended, and difficulty in designing the optical amplifier is reduced.

In this embodiment of this application, the at least two gain modes include the first gain mode, the second gain mode, and the third gain mode.

Further, refer to FIG. 10. When the gain mode of the optical amplifier is the first gain mode, the first input port 611*a*1 is connected to the first output port 611*b*1, the second input port 611*a*2 is connected to the second output port 611*b*2, the third input port 612*a*1 is connected to the third output port 612*b*1, and the fourth input port 612*a*2 is connected to the fourth output port 612*b*2, so that the input optical signal of the optical amplifier sequentially flows through the first-stage optical amplifier unit 601, the DGE 62, the first optical switch 611, the second-stage optical amplifier unit 602, and the second optical switch 612, and then is output.

In this embodiment of this application, when the gain mode of the optical amplifier is the first gain mode, both the first optical switch 611 and the second optical switch 612 are set to a dual-pass mode, and power of a pump laser corresponding to the third-stage optical amplifier unit 603 is reduced, or the pump laser is turned off. In this case, an optical service signal enters from an input end of the optical amplifier, sequentially flows through the first-stage optical amplifier unit 601, the DGE 62, the first optical switch 611, the second-stage optical amplifier unit 602, and the second optical switch 612, and then is output, so that the optical service signal that enters from the input end of the optical amplifier may be output after being amplified by the first-stage optical amplifier unit 601 and the second-stage optical amplifier unit 602.

In this embodiment, the power of the pump laser corresponding to the third-stage optical amplifier unit 603 is reduced, or the pump laser is turned off, so that power consumption of the optical amplifier may be reduced, and a self-loop phenomenon of the third-stage optical amplifier unit 603 may be avoided.

When the gain mode of the optical amplifier is the second gain mode, the first input port 611*a*1 is connected to the second output port 611*b*2, and the fourth input port 612*a*2 is connected to the third output port 612*b*1, so that the input optical signal of the optical amplifier sequentially flows through the first-stage optical amplifier unit 601, the DGE 62, the first optical switch 611, the third-stage optical amplifier unit 603, and the second optical switch 612, and then is output.

In this embodiment, both the first optical switch 611 and the second optical switch 612 are set to a cross-connected mode. That is, the first input port 611*a*1 and the second output port 611*b*2 of the first optical switch 611 are connected, and the fourth input port 612*a*2 and the third output port 612*b*1 of the second optical switch 612 are connected. In addition, power of a pump laser corresponding to the second-stage optical amplifier unit 602 is reduced, or the pump laser is turned off, so that the optical service signal that enters from the input end of the optical amplifier may be output after being amplified by the first-stage optical amplifier unit 601 and the third-stage optical amplifier unit 603.

In this embodiment, the power of the pump laser corresponding to the second-stage optical amplifier unit 602 is reduced, or the pump laser is turned off, so that on one hand, power consumption of the optical amplifier is reduced, and on the other hand, a self-loop phenomenon that occurs in the second-stage optical amplifier unit 602 due to connection statuses of the first optical switch 611 and the second optical switch 612 in this state may be avoided.

It should be noted that, in this embodiment of this application, a pump laser used by an optical amplifier unit may perform optical splitting by using an optical splitter, so that the pump laser is shared, thereby further reducing costs. In addition, a problem that a power of the pump laser needs to be reduced or the pump laser of the optical amplifier unit is turned off in some gain modes may be resolved. A specific implementation may be set based on an actual requirement, and details are not described herein.

When the gain mode of the optical amplifier is the third gain mode, the first input port 611*a*1 is connected to the first output port 611*b*1, the second input port 611*a*2 is connected to the second output port 611*b*2, the third input port 612*a*1 is connected to the fourth output port 612*b*2, and the fourth input port 612*a*2 is connected to the third output port 612*b*1, so that the input optical signal of the optical amplifier sequentially flows through the first-stage optical amplifier unit 601, the DGE 62, the first optical switch 611, the second-stage optical amplifier unit 602, the second optical switch 612, the third-stage optical amplifier unit 603, and the second optical switch 612, and then is output.

In this embodiment, the first optical switch 611 is set to the dual-pass mode, and the second optical switch 612 is set to the cross-connected mode. That is, in the first optical switch 611, the first input port 611*a*1 is connected to the first output port 611*b*1, and the second input port 611*a*2 is connected to the second output port 611*b*2, and in the second optical switch 612, the third input port 612*a*1 is connected to the fourth output port 612*b*2, and the fourth input port 612*a*2 is connected to the third output port 612*b*1. In this case, an optical service signal enters from the input end of the optical amplifier, sequentially passes through the first-stage optical amplifier unit 601, the second-stage optical amplifier unit 602, and the third-stage optical amplifier unit 603, and is finally output by using the output port of the optical amplifier.

In the technical solution of this embodiment, there are two 2*2 optical switches, the DGE is deployed after the first-stage optical amplifier unit, and the optical amplifier is extended from two gain modes to three gain modes, so that a dynamic range of the optical amplifier is further extended. In addition, compared with an optical amplifier with a large dynamic range, the optical amplifier has better NF performance and flatness performance, a simpler design, and lower costs.

Further, in the foregoing embodiments of this application, the control circuit 63 is further configured to adjust the attenuation spectrum of the DGE based on input port data and/or output port data of the optical amplifier.

For example, the control circuit 63 is further separately connected to the input port and/or the output port of the optical amplifier, and may obtain the input port data and/or the output port data of the optical amplifier, to implement real-time control and dynamic adjustment of the attenuation spectrum of the DGE, thereby ensuring normal working of the optical amplifier.

Further, based on the foregoing embodiments, an input port and an output port of an optical switch may include 1×N, N×1, and N×N dimensions, and N is a natural number whose value is greater than or equal to 2. A combination of a plurality of optical switches controls a connection combination of different optical amplifier units. Different optical switch combinations generate different optical paths, but a principle is the same.

Embodiment 8

Figure 11:
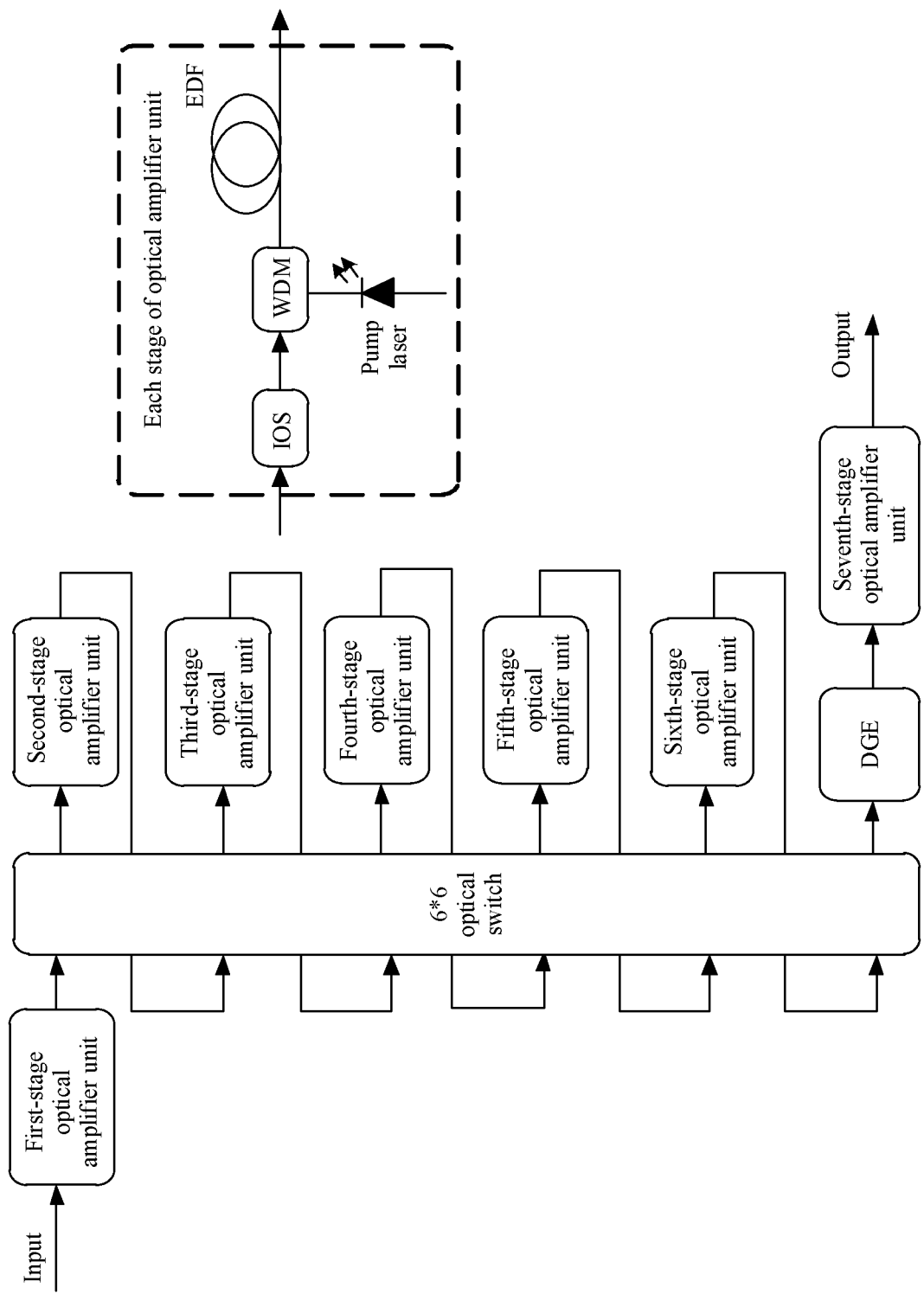
FIG. 11 is yet another schematic diagram of a structure of an optical amplifier according to an embodiment of this application.

For example, based on the foregoing embodiments, FIG. 11 is yet another schematic diagram of a structure of an optical amplifier according to an embodiment of this application. For example, an optical switch may be an N*N-dimensional optical switch. N is a positive integer, and a specific value of N may be determined based on an actual situation, and is not limited in this embodiment.

For example, refer to FIG. 11. In this embodiment, the optical amplifier may include one 6*6 optical switch and seven stages of optical amplifier units. A first-stage optical amplifier unit, the optical switch, a DGE, and a seventh-stage optical amplifier unit are connected on a main optical path of the optical amplifier. A second-stage optical amplifier unit to a sixth-stage optical amplifier unit are connected on branch optical paths of the optical amplifier. Each stage of optical amplifier unit includes an ISO, a WDM, an EDF, a pump laser, and the like.

In this embodiment, a quantity of optical amplifier units connected on the optical paths may be a quantity of optical amplifier units combined in any way based on a connection mode of the optical switch, and ranges from 2 (when a first input port of the optical switch is connected to a sixth output port) to 7 (when the first input port of the optical switch is connected to a first output port, a second input port is connected to a second output port, and so on, until a sixth input port is connected to the sixth output port). The quantity of optical amplifier units connected on the optical paths may be changed by changing the connection mode of the optical switch. Any combination of optical amplifier units is an amplification mode, and the amplification modes share the DGE.

It may be understood that, in this embodiment of this application, that the optical switch has 6×6 dimensions and a quantity of optical amplifier units is 7 is used as an example for description. The dimensions of the optical switch and the quantity of optical amplifier units may be determined based on an actual situation, and details are not described herein.

Embodiment 9

Figure 12:
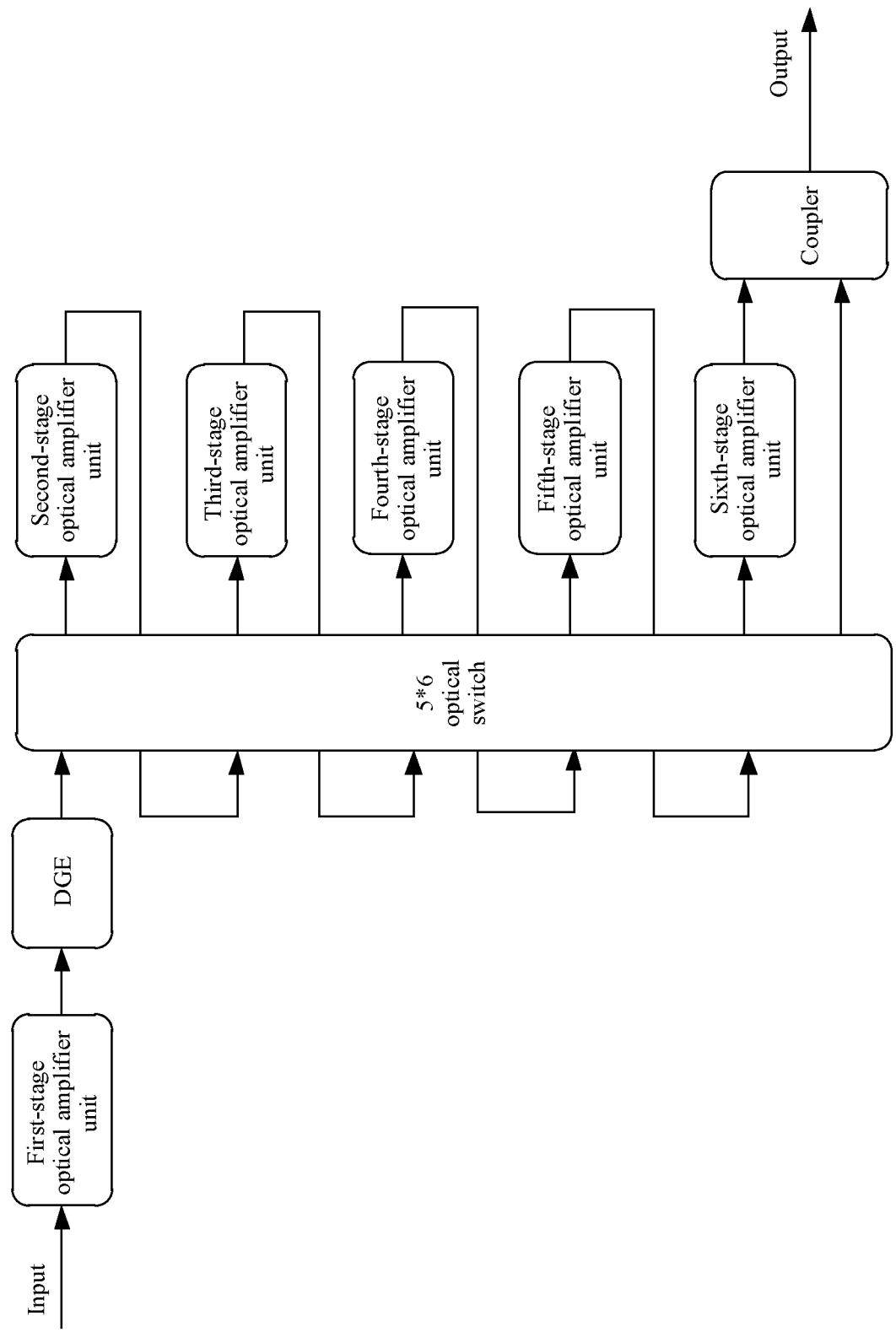
FIG. 12 is yet another schematic diagram of a structure of an optical amplifier according to an embodiment of this application.

For example, based on the foregoing embodiments, FIG. 12 is yet another schematic diagram of a structure of an optical amplifier according to an embodiment of this application. For example, an optical switch may be an N*M-dimensional optical switch. Both N and M are positive integers, and specific values of N and M may be determined based on an actual situation, and are not limited in this embodiment.

For example, refer to FIG. 12. In this embodiment, the optical switch may be a 5*6-dimensional optical switch, so that the optical amplifier may include one 5*6 optical switch and six stages of optical amplifier units. A first-stage optical amplifier unit, a DGE, the optical switch, and a coupler are connected on a main optical path of the optical amplifier. A second-stage optical amplifier unit to a sixth-stage optical amplifier unit are connected on branch optical paths of the optical amplifier.

In this embodiment, a quantity of optical amplifier units connected on the optical paths may alternatively be a quantity of optical amplifier units combined in any way based on a connection mode of the optical switch, and ranges from 1 (when a first input port of the optical switch is connected to a sixth output port) to 6 (when the first input port of the optical switch is connected to a first output port, a second input port is connected to a second output port, and so on, until a fifth input port is connected to a fifth output port and the sixth output port). The quantity of optical amplifier units connected on the optical paths may be changed by changing the connection mode of the optical switch. Any combination of optical amplifier units is an amplification mode, and the amplification modes share the DGE.

It may be understood that, in this embodiment of this application, that the optical switch has 5*6 dimensions and a quantity of optical amplifier units is 6 is used as an example for description. The dimensions of the optical switch and the quantity of optical amplifier units may be determined based on an actual situation, and details are not described herein.

Embodiment 10

Figure 13:
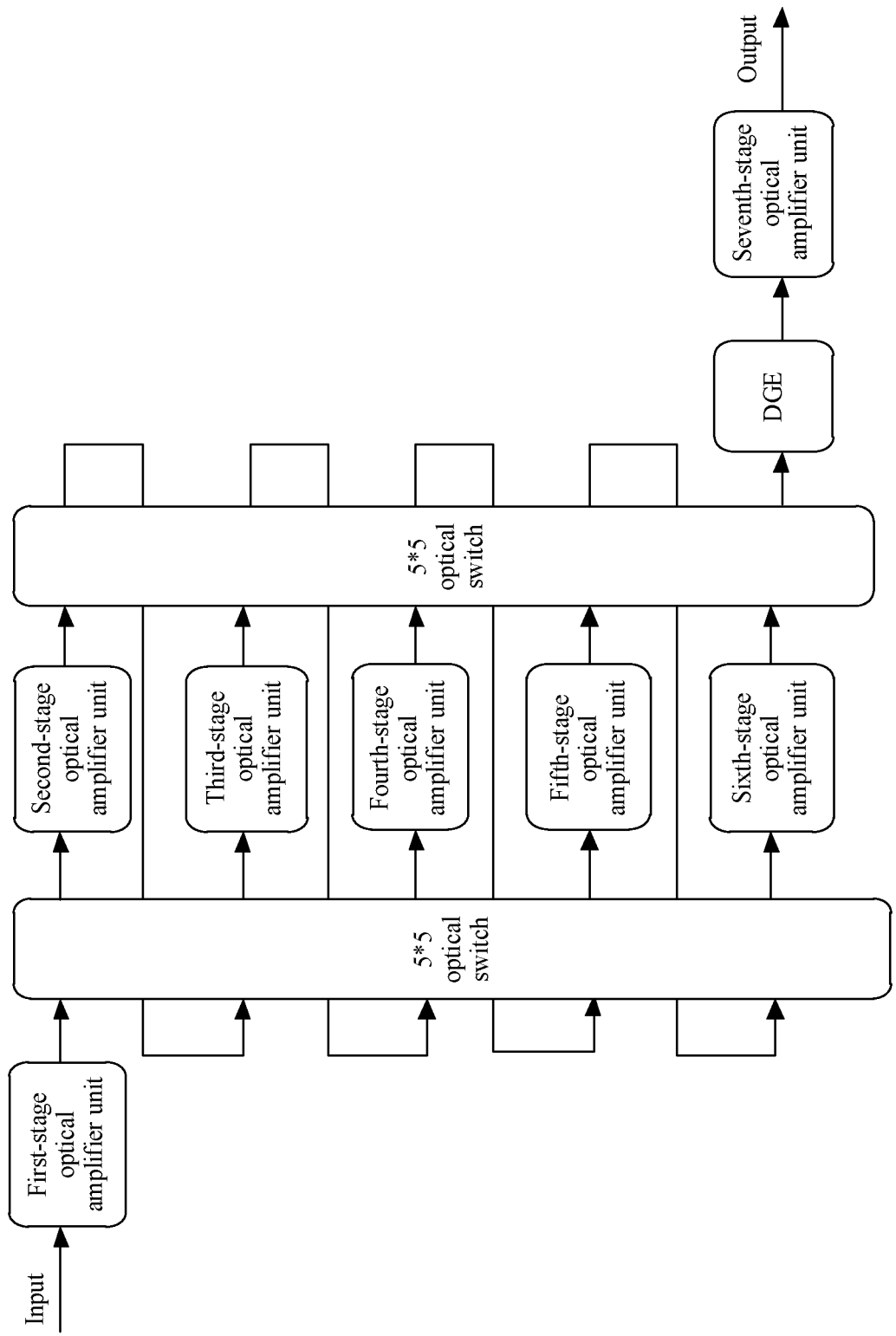
FIG. 13 is yet another schematic diagram of a structure of an optical amplifier according to an embodiment of this application.

For example, based on the foregoing embodiments, FIG. 13 is yet another schematic diagram of a structure of an optical amplifier according to an embodiment of this application. For example, there may be at least two optical switches, and each optical switch may be an N*M-dimensional optical switch. Both N and M are positive integers, and values of N and M may be the same or different. Specific values may be determined based on an actual situation, and are not limited in this embodiment.

For example, refer to FIG. 13. In this embodiment, that two optical switches each have 5*5 dimensions is used as an example for description, so that the optical amplifier may include a first 5*5 optical switch, a second 5*5 optical switch, and seven stages of optical amplifier units. A first-stage optical amplifier unit, the first 5*5 optical switch, the second 5*5 optical switch, a DGE, and a seventh-stage optical amplifier unit are connected on a main optical path of the optical amplifier. A second-stage optical amplifier unit to a sixth-stage optical amplifier unit are connected on branch optical paths of the optical amplifier.

In this embodiment, a quantity of optical amplifier units connected on the optical paths may be a quantity of optical amplifier units combined in any way based on connection modes of the first 5*5 optical switch and the second 5*5 optical switch, and ranges from 3 (when a first input port of the first 5*5 optical switch is connected to any output port of the first 5*5 optical switch, and a corresponding input port of the second 5*5 optical switch is connected to a fifth output port of the second 5*5 optical switch) to 7 (when the first input port of the first 5*5 optical switch is connected to a first output port of the first 5*5 optical switch, a first input port of the second 5*5 optical switch is connected to a first output port of the second 5*5 optical switch, and so on, until a fifth input port of the first 5*5 optical switch is connected to a fifth output port of the first 5*5 optical switch, and a fifth input port of the second 5*5 optical switch is connected to the fifth output port of the second 5*5 optical switch). The quantity of optical amplifier units connected on the optical paths may be changed by changing the connection modes of the optical switches. Any combination of optical amplifier units is an amplification mode, and the amplification modes share the DGE.

It may be understood that, when there is a path, on which no optical amplifier unit is connected, between the first 5*5 optical switch and the second 5*5 optical switch, a minimum quantity of optical amplifier units connected on the optical paths may be 2. Whether an optical amplifier unit is connected between the first 5*5 optical switch and the second 5*5 optical switch may be determined based on an actual requirement, and details are not described herein.

In this embodiment of this application, compared with an optical amplifier including a single optical switch, the optical amplifier including two optical switches implements more flexible amplification modes and more combinations.

Based on the foregoing embodiments, the embodiments of this application further provide an optical signal processing method. The following describes the technical solutions of this application in detail with reference to the optical amplifiers provided in FIG. 4 and FIG. 5 and the optical amplifiers provided in FIG. 6 to FIG. 10. For details that are not described in the method embodiments, refer to the foregoing embodiments of the optical amplifiers.

Figure 14:
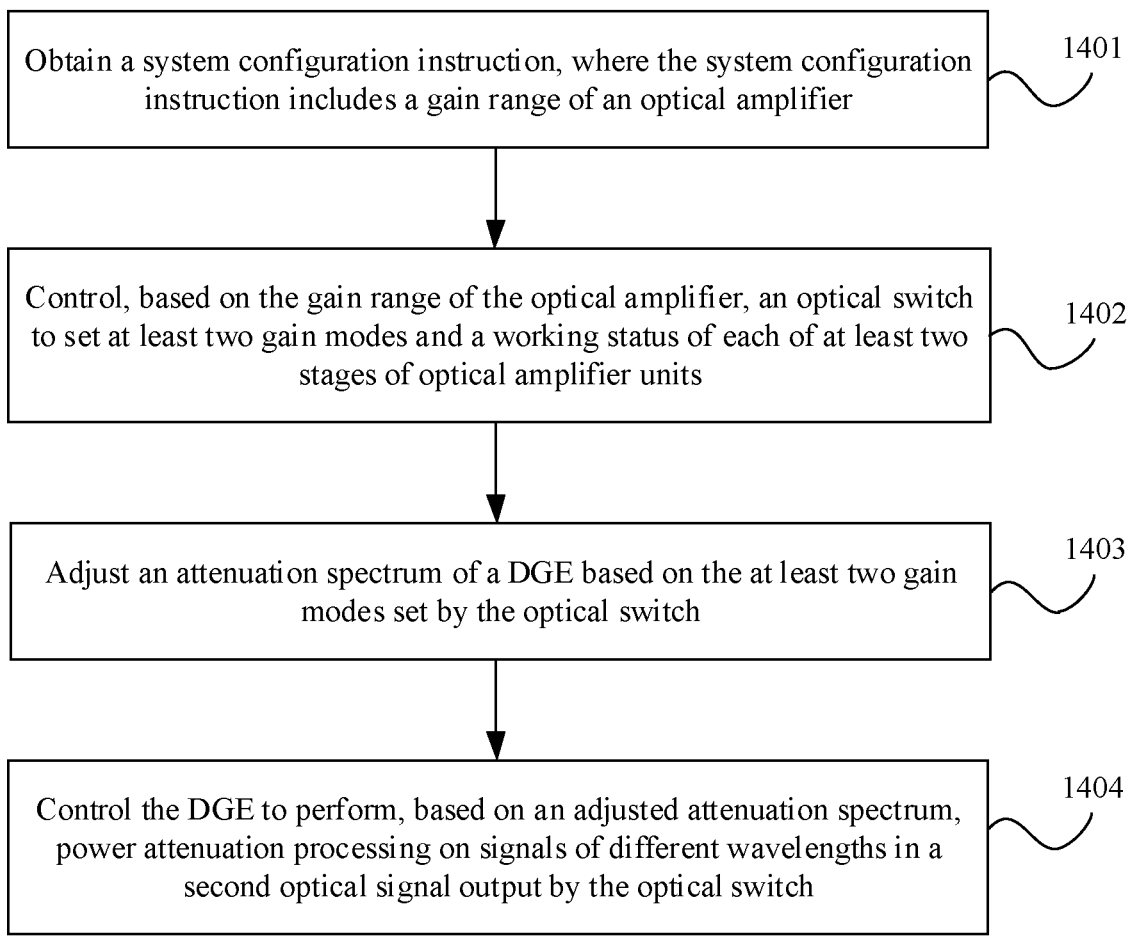
FIG. 14 is a schematic flowchart of Embodiment 1 of an optical signal processing method according to this application.

FIG. 14 is a schematic flowchart of Embodiment 1 of an optical signal processing method according to this application. The method is applied to the optical amplifier shown in FIG. 4. Further, refer to FIG. 4. It may be learned that the optical amplifier includes at least two stages of optical amplifier units, an optical switch, a DGE, and a control circuit, and the at least two stages of optical amplifier units include a first-stage optical amplifier unit and a second-stage optical amplifier unit. An input end of the optical switch is separately connected to an output end of the first-stage optical amplifier unit and an output end of the second-stage optical amplifier unit, and an output end of the optical switch is separately connected to an input end of the second-stage optical amplifier unit and an input end of the DGE. The control circuit is separately connected to the optical switch and the DGE. Correspondingly, as shown in FIG. 14, the method may include the following steps.

Step 1401: Obtain a system configuration instruction, where the system configuration instruction includes a gain range of the optical amplifier.

For example, in this embodiment of this application, the gain range of the optical amplifier may be configured by an external network management system. Therefore, the network management system may deliver the configured gain range of the optical amplifier to the optical amplifier. Then, the optical amplifier controls the optical switch, each stage of optical amplifier unit, and the DGE based on the obtained gain range of the optical amplifier.

It may be understood that, in specific implementation, the optical amplifier is considered as an entire component, and an execution body of the method is the optical amplifier. In practical application, control of each component in the optical amplifier is actually performed by the control circuit in the optical amplifier.

Further, in this embodiment of this application, the system configuration instruction may be further used to initialize and configure components of the optical amplifier in a direction from a transmit end to a receive end, to ensure that the optical amplifier is under precise control.

Step 1402: Based on the gain range of the optical amplifier, control the optical switch to set at least two gain modes and a working status of each of the at least two stages of optical amplifier units.

The first-stage optical amplifier unit is configured to amplify an input optical signal of the optical amplifier, and the second-stage optical amplifier unit is configured to amplify a first optical signal output by the optical switch.

In this embodiment of this application, after determining the gain range of the optical amplifier based on the obtained system configuration instruction, the optical amplifier may control, based on the gain range of the optical amplifier, the gain modes set by the optical switch and the working status of each stage of optical amplifier unit.

For example, refer to the optical amplifier shown in FIG. 4. The optical switch includes a first input port, a second input port, a first output port, and a second output port. When the at least two gain modes that may be set by the optical switch include a first gain mode and a second gain mode, so that an implementation of controlling the optical switch to set at least two gain modes may be as follows.

In an example, when the gain mode of the optical amplifier is the first gain mode, the first input port is controlled to connect to the first output port, and the second input port is controlled to connect to the second output port, so that the input optical signal of the optical amplifier sequentially flows through the first-stage optical amplifier unit, the optical switch, the second-stage optical amplifier unit, the optical switch, and the DGE, and then is output.

For example, an overall dynamic range of the optical amplifier is 14 dB to 32 dB. In an example, if the gain range of the optical amplifier that is set in the system configuration instruction is 19 dB to 32 dB, so that the first input port of the optical switch may be controlled to connect to the first output port, and the second input port may be controlled to connect to the second output port, so that the optical amplifier is in the first gain mode, and the input optical signal of the optical amplifier sequentially flows through the first-stage optical amplifier unit, the optical switch, the second-stage optical amplifier unit, the optical switch, and the DGE, and then is output. In this case, working statuses of the first-stage optical amplifier unit and the second-stage optical amplifier unit are normal.

In another example, when the gain mode of the optical amplifier is the second gain mode, the first input port is controlled to connect to the second output port, so that the input optical signal of the optical amplifier sequentially flows through the first-stage optical amplifier unit, the optical switch, and the DGE, and then is output.

For example, if the gain range of the optical amplifier that is set in the system configuration instruction is 14 dB to 20 dB, so that the first input port of the optical switch may be controlled to connect to the second output port, so that the optical amplifier is in the second gain mode, and the input optical signal of the optical amplifier sequentially flows through the first-stage optical amplifier unit, the optical switch, and the DGE, and then is output. In this case, a working status of the first-stage optical amplifier unit is normal. However, a pump laser in the second-stage optical amplifier unit is turned off, or power of the pump laser in the second-stage optical amplifier unit is reduced, to avoid self-excitation caused by a loop formed in the second-stage optical amplifier unit.

It may be understood that each optical amplifier unit has an independent pump laser, and a transmit power value of the pump laser is adjusted based on different gain values. Pump lasers corresponding to different optical amplifier units are different. Changing power of a pump laser affects a gain spectrum of an optical amplifier unit. An attenuation spectrum of the DGE is matched to the gain spectrum of the optical amplifier unit.

Step 1403: Adjust the attenuation spectrum of the DGE based on the at least two gain modes set by the optical switch.

In this embodiment, after determining the gain mode set by the optical switch, the optical amplifier may adjust the attenuation spectrum of the DGE based on the set gain range of the optical amplifier, so that the attenuation spectrum of the DGE can match gain spectra of the stages of optical amplifier units, thereby ensuring that output optical signal power of the optical amplifier is flat. In this way, an overall amplification multiple of the optical amplifier meets a design requirement, that is, a gain of the optical amplifier is ensured to meet a setting, and flatness of output optical power distribution meets a requirement.

For example, when the attenuation spectrum of the DGE is generated in advance, and correspondences between gain ranges of different gain modes and attenuation spectra of the DGE are preset in the network management system, after obtaining the gain range of the optical amplifier and the gain mode of the optical switch, the control circuit of the optical amplifier may obtain response of the DGE by using a table lookup method based on the gain ranges of the different gain modes, to control the DGE. Because the attenuation spectrum generated in advance matches a rated working dynamic range of the optical amplifier, the gain range of the optical amplifier is not to be exceeded during subsequent use.

In this embodiment, the control circuit of the optical amplifier adjusts the attenuation spectrum of the DGE, so that output optical power of the optical amplifier is as flat as possible.

Step 1404: Control the DGE to perform, based on an adjusted attenuation spectrum, power attenuation processing on signals of different wavelengths in a second optical signal output by the optical switch.

In this embodiment, the DGE is disposed at the output end of the optical switch. Further, the DGE is connected to the second output port of the optical switch. In this way, the second optical signal output by using the second output port of the optical switch flows through the DGE. In this way, the DGE may perform power attenuation processing on the signals of different wavelengths based on the gain range of the optical amplifier, to ensure that the gain range of the optical amplifier meets a design requirement.

Further, in this embodiment of this application, the control circuit of the optical amplifier may be further connected to an optical MON port, a PIN photodiode (PIN), and/or an optical performance monitor (OPM) at an input end of the optical amplifier, and/or the control circuit of the optical amplifier may be further connected to an optical MON port and/or a PIN photodiode at an output end of the optical amplifier. Therefore, the optical signal processing method provided in this embodiment may further include the following steps.

A1: Obtain input port data and/or output port data of the optical amplifier.

A2: Adjust the attenuation spectrum of the DGE based on the input port data and/or the output port data of the optical amplifier.

In this embodiment, the optical amplifier detects power of each wavelength of an optical signal at an output port of the optical amplifier by using a spectrometer or a spectrum detection tool with a same function connected to the MON port, and feeds back the power of each wavelength of the optical signal to the control circuit. The control circuit adjusts a working current of a pump laser in each optical amplifier unit based on output power distribution of the optical amplifier, to adjust transmit optical power of the pump laser, thereby ensuring that the optical amplifier works in the gain range set by the network management system.

The PINs at the input end and the output end of the optical amplifier are configured to detect total input power and total output power of the optical amplifier. A current value of the pump laser in each optical amplifier unit may be controlled based on the total input power and the total output power of the optical amplifier, to change optical power of the pump laser. Generally, when output power of the optical amplifier is not saturated, the output optical power of the optical amplifier can be increased by increasing power of the pump laser.

Further, the control circuit of the optical amplifier may control the attenuation spectrum of the DGE in real time based on monitoring data obtained by using the optical MON port, the PIN, and/or the OPM disposed at the input end and/or the output end of the optical amplifier. That is, the control circuit calculates a difference of a performance parameter such as the output optical signal power/the gain/an OSNR of the optical amplifier, to update and iterate the response of the DGE for a plurality of times until a difference of each performance parameter meets a set threshold requirement. Optionally, a set threshold is preset by the network management system.

In the optical signal processing method provided in this embodiment of this application, the optical amplifier obtains the system configuration instruction, where the system configuration instruction includes the gain range of the optical amplifier, controls, based on the gain range of the optical amplifier, the optical switch to set the at least two gain modes and the working status of each of the at least two stages of optical amplifier units, adjusts the attenuation spectrum of the DGE based on the at least two gain modes set by the optical switch, and controls the DGE to perform, based on the adjusted attenuation spectrum, power attenuation processing on the signals of different wavelengths in the second optical signal output by the optical switch. In this technical solution, the gain mode of the optical amplifier is set by using the optical switch, and gain adjustment is performed by using the DGE whose attenuation spectrum is adjustable. In this way, an inherent insertion loss of an intermediate stage of the optical amplifier is not increased, and better NF performance is obtained. If an NF is lower, a gain interval range of the optical amplifier can be extended, and control complexity of the optical switch can be reduced. In addition, an optical amplifier design in this application can enable a plurality of gain modes to share the DGE, thereby simplifying a structural design of the optical amplifier, and reducing difficulty in designing a dynamic GFF.

Figure 15:
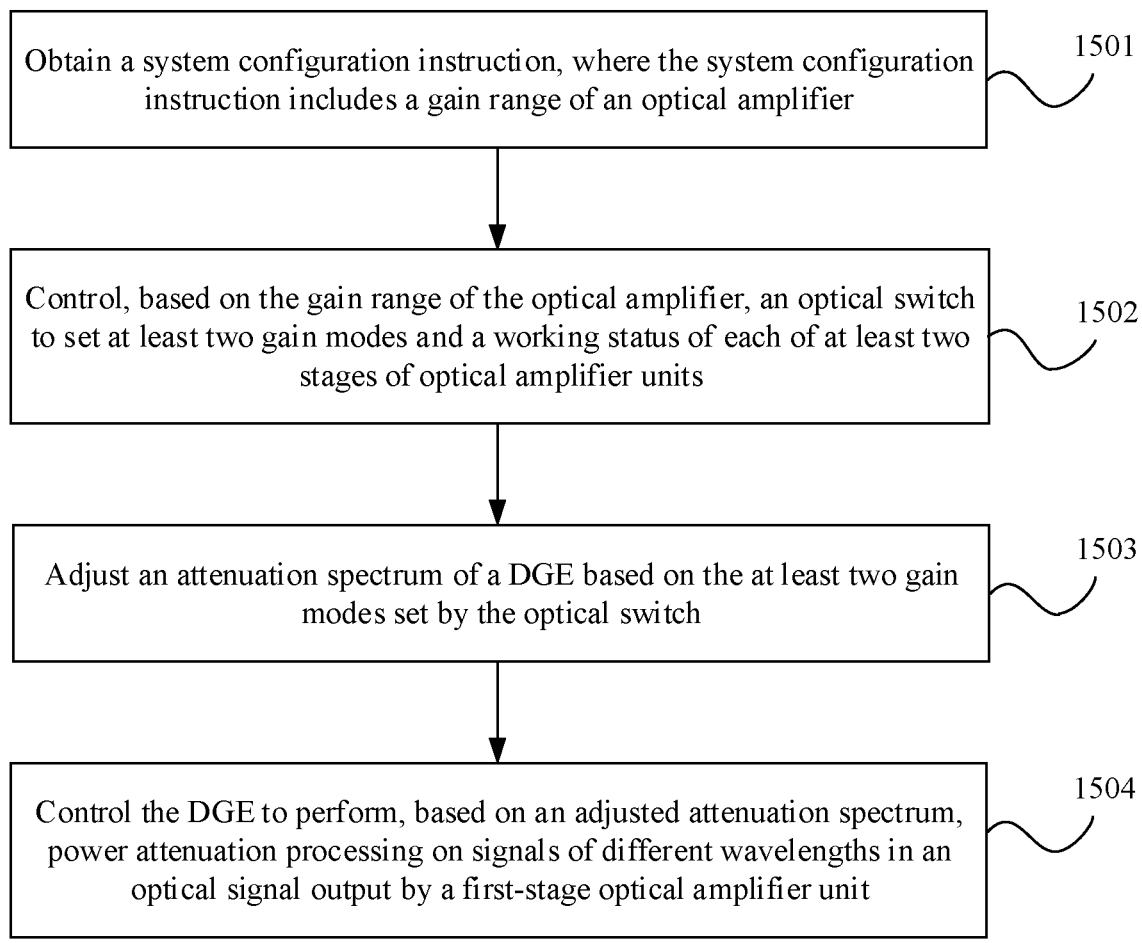
FIG. 15 is a schematic flowchart of Embodiment 2 of an optical signal processing method according to this application.

FIG. 15 is a schematic flowchart of Embodiment 2 of an optical signal processing method according to this application. The method is applied to the optical amplifier shown in FIG. 6. Further, refer to FIG. 6. It may be learned that the optical amplifier includes at least two stages of optical amplifier units, an optical switch, a DGE, and a control circuit, and the at least two stages of optical amplifier units include a first-stage optical amplifier unit and a second-stage optical amplifier unit. The DGE is disposed between an output end of the first-stage optical amplifier unit and an input end of the optical switch, and an output end of the optical switch is connected to an input end of the second-stage optical amplifier unit. The control circuit is separately connected to the optical switch and the DGE. Correspondingly, as shown in FIG. 15, the method may include the following steps.

Step 1501: Obtain a system configuration instruction, where the system configuration instruction includes a gain range of the optical amplifier.

Step 1502: Based on the gain range of the optical amplifier, control the optical switch to set at least two gain modes and a working status of each of the at least two stages of optical amplifier units.

The first-stage optical amplifier unit is configured to amplify an input optical signal of the optical amplifier, and the second-stage optical amplifier unit is configured to amplify a first optical signal output by the optical switch.

In this embodiment of this application, the optical amplifier may also determine the gain range of the optical amplifier based on the obtained system configuration instruction, and then may control, based on the gain range of the optical amplifier, the gain modes set by the optical switch and the working status of each stage of optical amplifier unit.

For example, in a possible design of this application, refer to the optical amplifier shown in FIG. 6. There is one optical switch, and when the optical switch includes a first input port, a first output port, and a second output port, the optical amplifier further includes a coupler. The at least two gain modes that may be set by the optical switch include a first gain mode and a second gain mode. In this case, an implementation of controlling the optical switch to set at least two gain modes may be as follows.

In an example, when the gain mode of the optical amplifier is the first gain mode, the first input port is controlled to connect to the first output port, so that the input optical signal of the optical amplifier sequentially flows through the first-stage optical amplifier unit, the DGE, the optical switch, the second-stage optical amplifier unit, and the coupler, and then is output. In this case, working statuses of the first-stage optical amplifier unit and the second-stage optical amplifier unit are normal.

In another example, when the gain mode of the optical amplifier is the second gain mode, the first input port is controlled to connect to the second output port, so that the input optical signal of the optical amplifier sequentially flows through the first-stage optical amplifier unit, the DGE, the optical switch, and the coupler, and then is output. In this case, a working status of the first-stage optical amplifier unit is normal. However, a pump laser in the second-stage optical amplifier unit is turned off, or power of the pump laser in the second-stage optical amplifier unit is reduced, to avoid self-excitation caused by a loop formed in the second-stage optical amplifier unit.

For example, in another possible design of this application, refer to the optical amplifier shown in FIG. 10. The at least two stages of optical amplifier units further include a third-stage optical amplifier unit. That is, the optical amplifier includes the first-stage optical amplifier unit, the second-stage optical amplifier unit, and the third-stage optical amplifier unit. There are two optical switches, and the two optical switches include a first optical switch and a second optical switch. The first optical switch includes a first input port, a second input port, a first output port, and a second output port. The second optical switch includes a third input port, a fourth input port, a third output port, and a fourth output port. The at least two gain modes that may be set by the optical switch include a first gain mode, a second gain mode, and a third gain mode, so that the controlling the optical switch to set at least two gain modes may be implemented in the following manner.

In an example, when the gain mode of the optical amplifier is the first gain mode, the first input port is controlled to connect to the first output port, the second input port is controlled to connect to the second output port, the third input port is controlled to connect to the third output port, and the fourth input port is controlled to connect to the fourth output port, so that the input optical signal of the optical amplifier may sequentially flow through the first-stage optical amplifier unit, the DGE, the first optical switch, the second-stage optical amplifier unit, and the second optical switch, and then be output.

Further, in this embodiment, both the first optical switch and the second optical switch are set to a dual-pass mode, and power of a pump laser corresponding to the third-stage optical amplifier unit is reduced, or the pump laser is turned off, so that power consumption of the optical amplifier is reduced, and a self-loop phenomenon that occurs in the third-stage optical amplifier unit due to connection statuses of the first optical switch and the second optical switch may be avoided. In this way, overall output of the optical amplifier meets a gain requirement.

In another example, when the gain mode of the optical amplifier is the second gain mode, the first input port is controlled to connect to the second output port, and the fourth input port is controlled to connect to the third output port, so that the input optical signal of the optical amplifier sequentially flows through the first-stage optical amplifier unit, the DGE, the first optical switch, the third-stage optical amplifier unit, and the second optical switch, and then is output.

In this embodiment, both the first optical switch and the second optical switch are set to a cross-connected mode, and power of a pump laser corresponding to the second-stage optical amplifier unit is reduced, or the pump laser is turned off. By reducing the power of the pump laser corresponding to the second-stage optical amplifier unit or turning off the pump laser, power consumption of the optical amplifier may be reduced, and a self-loop phenomenon of the second-stage optical amplifier unit may be avoided.

In still another example, when the gain mode of the optical amplifier is the third gain mode, the first input port is controlled to connect to the first output port, the second input port is controlled to connect to the second output port, the third input port is controlled to connect to the fourth output port, and the fourth input port is controlled to connect to the third output port, so that the input optical signal of the optical amplifier sequentially flows through the first-stage optical amplifier unit, the DGE, the first optical switch, the second-stage optical amplifier unit, the second optical switch, the third-stage optical amplifier unit, and the second optical switch, and then is output.

In this embodiment, the first optical switch is set to the dual-pass mode, and the second optical switch is set to the cross-connected mode. In this case, the three stages of optical amplifier units included in the optical amplifier work normally. When the optical amplifier is in the third gain mode, the optical amplifier has a highest gain compared with the first gain mode and the second gain mode.

Step 1503: Adjust an attenuation spectrum of the DGE based on the at least two gain modes set by the optical switch.

Step 1504: Control the DGE to perform, based on an adjusted attenuation spectrum, power attenuation processing on signals of different wavelengths in an optical signal output by the first-stage optical amplifier unit.

In this embodiment, the DGE is disposed before the optical switch and after the first-stage optical amplifier unit, and the optical signal output by the first-stage optical amplifier unit flows through the DGE. In this way, the DGE may perform power attenuation processing on the signals of different wavelengths based on the gain range of the optical amplifier, to ensure that the gain range of the optical amplifier meets a design requirement.

It may be understood that implementation principles of step 1501 and step 1504 in this embodiment are the same as implementation principles of step 1401 and step 1404 in the method embodiment shown in FIG. 14, and details are not described herein.

Further, in this embodiment, the method may further include the following steps.

B1: Obtain input port data and/or output port data of the optical amplifier.

B2: Adjust the attenuation spectrum of the DGE based on the input port data and/or the output port data of the optical amplifier.

In this embodiment, implementation principles of B1 and B2 are the same as implementation principles of A1 and A2 in the method embodiment shown in FIG. 14, and details are not described herein.

Further, for details that are not described in this embodiment, refer to the descriptions in the embodiments of the optical amplifiers in FIG. 4 to FIG. 13. Details are not described herein.

For example, an embodiment of this application further provides a computer-readable storage medium. The computer-readable storage medium stores instructions, and when the instructions are run on a computer, the computer is enabled to perform the method in the embodiment shown in FIG. 14.

For example, an embodiment of this application further provides a computer-readable storage medium. The computer-readable storage medium stores instructions, and when the instructions are run on a computer, the computer is enabled to perform the method in the embodiment shown in FIG. 15.

In this application, "at least one" means one or more, and "a plurality of" means two or more. The term "and/or" describes an association relationship between associated objects and may indicate three relationships. For example, A and/or B may indicate the following cases: only A exists, both A and B exist, and only B exists. A and B may be singular or plural. The character "/" indicates that a relationship between associated objects is "or". In a formula, the character "/" indicates that a relationship between associated objects is "division". "At least one of the following items (pieces)" or a similar expression thereof means any combination of these items, including any combination of singular items (pieces) or plural items (pieces). For example, at least one of a, b, or c may represent a, b, c, a-b, a-c, b-c, or a-b-c, where a, b, and c may be one or more in quantity.

It may be understood that various numbers in the embodiments of this application are merely used for differentiation for ease of description, and are not used to limit the scope of the embodiments of this application.

It may be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

What is claimed is:

1. An optical amplifier comprising:
   a dynamic gain equalizer (DGE) comprising a first input end;
   at least two stages of optical amplifier systems comprising:
      a first-stage optical amplifier system comprising a first output end and configured to amplify an input optical signal of the optical amplifier; and
      a second-stage optical amplifier system comprising a second output end, comprising a second input end, and configured to amplify a first optical signal;
   an optical switch, comprising a third input end coupled to the first output end and the second output end, comprising a third output end coupled to the second input end and the first input end, and configured to:
      set at least two gain modes of the optical amplifier, wherein amplification multiples of the optical amplifier are different when the optical amplifier is in different gain modes;
      output the first optical signal; and
   output a second optical signal; and
   a control circuit coupled to the optical switch and the DGE and configured to:
      control the optical switch to set the at least two gain modes; and
      adjust an attenuation spectrum of the DGE based on the at least two gain modes to obtain an adjusted attenuation spectrum, and
   wherein the DGE is configured to perform, based on the adjusted attenuation spectrum, power attenuation processing on signals of different wavelengths in the second optical signal.

2. The optical amplifier of claim 1, wherein the optical switch further comprises:
   a first input port coupled to the first output end;
   a second input port coupled to the second output end;
   a first output port coupled to the second input end; and
   a second output port coupled to the first input end,
   wherein the optical amplifier further comprises a third output port, and
   wherein the DGE further comprises a fourth output end coupled to the third output port.

3. The optical amplifier of claim 2, wherein the at least two gain modes comprise: a first gain mode and a second gain mode, wherein when the optical amplifier is in the first gain mode, the first input port is coupled to the first output port and the second input port is coupled to the second output port to enable the input optical signal to sequentially flow through the first-stage optical amplifier system, the optical switch, the second-stage optical amplifier system, the optical switch, and the DGE and then to output from the optical amplifier, and wherein when the optical amplifier is in the second gain mode, the first input port is coupled to the second output port to enable the input optical signal to sequentially flow through the first-stage optical amplifier system, the optical switch, and the DGE and then to output from the optical amplifier.

4. The optical amplifier of claim 3, wherein the at least two stages of optical amplifier systems further comprise a third-stage optical amplifier system coupled between the fourth output end and a fifth output end of the optical amplifier, wherein when the optical amplifier is in the first gain mode, the first-stage optical amplifier system, the second-stage optical amplifier system, and the third-stage optical amplifier system are configured to amplify and output the input optical signal, and wherein when the optical amplifier is in the second gain mode, the first-stage optical amplifier system and the third-stage optical amplifier system are configured to amplify and output the input optical signal.

5. The optical amplifier of claim 1, wherein the control circuit is further configured to further adjust the attenuation spectrum based on input port data of the optical amplifier or output port data of the optical amplifier.

6. An optical amplifier comprising:
   a dynamic gain equalizer (DGE);
   at least two stages of optical amplifier systems comprising:
      a first-stage optical amplifier system comprising a first output end and configured to:
         amplify an input optical signal of the optical amplifier to obtain a first optical signal; and
         output the first optical signal; and
      a second-stage optical amplifier system comprising a first input end and configured to amplify a second optical signal;

an optical switch comprising a second input end positioned such that the DGE is disposed between the first output end and the second input end, comprising a second output end coupled to the first input end, and configured to:
set at least two gain modes of the optical amplifier, wherein amplification multiples of the optical amplifier are different when the optical amplifier is in different gain modes; and
output the second optical signal; and
a control circuit coupled to the optical switch and the DGE and configured to:
control the optical switch to set the at least two gain modes; and
adjust an attenuation spectrum of the DGE based on the at least two gain modes to obtain an adjusted attenuation spectrum, and
wherein the DGE is configured to perform, based on the adjusted attenuation spectrum, power attenuation processing on signals of different wavelengths in the first optical signal.

7. The optical amplifier of claim 6, further comprising a coupler, wherein the DGE comprises a third output end, and wherein the optical switch further comprises:
a first input port coupled to the third output end;
a first output port coupled to the first input end; and
a second output port coupled to the coupler,
wherein the second-stage optical amplifier system further comprises a fourth output end coupled to the coupler, and
wherein the optical amplifier further comprises a third output port coupled to the coupler.

8. The optical amplifier of claim 7, wherein the at least two gain modes comprise: a first gain mode and a second gain mode, wherein when the optical amplifier is in the first gain mode, the first input port is coupled to the first output port to enable the input optical signal to sequentially flow through the first-stage optical amplifier system, the DGE, the optical switch, the second-stage optical amplifier system, and the coupler and then to output from the optical amplifier, and wherein when the optical amplifier is in the second gain mode, the first input port is coupled to the second output port to enable the input optical signal to sequentially flow through the first-stage optical amplifier system, the DGE, the optical switch, and the coupler and then to output from the optical amplifier.

9. The optical amplifier of claim 6, wherein the second-stage optical amplifier system further comprises a third output end, wherein the at least two stages of optical amplifier systems further comprise a third-stage optical amplifier system comprising a third input end and a fourth output end, wherein the optical amplifier further comprises two optical switches, wherein the two optical switches comprise:
a first optical switch comprising:
a first input port coupled to the DGE;
a first output port coupled to the first input end;
a second input port; and
a second output port coupled to the third input end; and
a second optical switch comprising:
a third input port coupled to the third output end;
a fourth input port coupled to the fourth output end;
a third output port; and
a fourth output port coupled to the second input port, and
wherein the optical amplifier further comprises a fifth output port coupled to the third output port.

10. The optical amplifier of claim 9, wherein the at least two gain modes comprise: a first gain mode, a second gain mode, and a third gain mode; wherein when the optical amplifier is in the first gain mode, the first input port is coupled to the first output port, the second input port is coupled to the second output port, the third input port is coupled to the third output port, and the fourth input port is coupled to the fourth output port to enable the input optical signal to sequentially flow through the first-stage optical amplifier system, the DGE, the first optical switch, the second-stage optical amplifier system, and the second optical switch and then to output from the optical amplifier, wherein when the optical amplifier is in the second gain mode, the first input port is coupled to the second output port and the fourth input port is coupled to the third output port to enable the input optical signal to sequentially flow through the first-stage optical amplifier system, the DGE, the first optical switch, the third-stage optical amplifier system, and the second optical switch and then to output from the optical amplifier, and wherein when the optical amplifier is in the third gain mode, the first input port is coupled to the first output port, the second input port is coupled to the second output port, the third input port is coupled to the fourth output port, and the fourth input port is coupled to the third output port to enable the input optical signal to sequentially flow through the first-stage optical amplifier system, the DGE, the first optical switch, the second-stage optical amplifier system, the second optical switch, the third-stage optical amplifier system, and the second optical switch and then to output from the optical amplifier.

11. The optical amplifier of claim 6, wherein the control circuit is further configured to further adjust the attenuation spectrum based on input port data of the optical amplifier or output port data of the optical amplifier.

12. A method implemented by an optical amplifier, wherein the method comprises:
obtaining a system configuration instruction comprising a gain range of the optical amplifier;
controlling, based on the gain range, an optical switch of the optical amplifier to set at least two gain modes and a working status of each of at least two stages of optical amplifier systems;
amplifying, using a first-stage optical amplifier system of the at least two stages of optical amplifier systems, an input optical signal of the optical amplifier;
amplifying, using a second-stage optical amplifier system of the at least two stages of optical amplifier systems, a first optical signal output by the optical switch;
adjusting an attenuation spectrum of a dynamic gain equalizer (DGE) of the optical amplifier based on the at least two gain modes to obtain an adjusted attenuation spectrum; and
controlling the DGE to perform, based on the adjusted attenuation spectrum, power attenuation processing on signals of different wavelengths in a second optical signal output by the optical switch.

13. The method of claim 12, wherein the at least two gain modes comprise a first gain mode and a second gain mode, and wherein the method further comprises:
controlling, when the optical amplifier is in the first gain mode, a first input port of the optical switch to be coupled to a first output port of the optical switch and a second input port to be coupled to a second output port to enable the input optical signal to sequentially flow through the first-stage optical amplifier system, the optical switch, the second-stage optical amplifier system, the optical switch, and the DGE and then to output from the optical amplifier; and controlling, when the optical amplifier is in the second gain mode, the first input port to be coupled to the second output port to enable the input optical signal to sequentially flow through the first-stage optical amplifier system, the optical switch, and the DGE and then to output from the optical amplifier.

14. The method of claim 12, further comprising:
obtaining input port data of the optical amplifier or output port data of the optical amplifier; and
further adjusting the attenuation spectrum based on the input port data or the output port data.

15. A method implemented by an optical amplifier, wherein the method comprises:
obtaining a system configuration instruction comprising a gain range of the optical amplifier;
controlling, based on the gain range, an optical switch of the optical amplifier to set at least two gain modes and a working status of each of at least two stages of optical amplifier systems;
amplifying, using a first-stage optical amplifier system of the at least two stages of optical amplifier systems, an input optical signal of the optical amplifier;
amplifying, using a second-stage optical amplifier system of the at least two stages of optical amplifier systems, a first optical signal output by the optical switch;
adjusting an attenuation spectrum of a dynamic gain equalizer (DGE) of the optical amplifier based on the at least two gain modes to obtain an adjusted attenuation spectrum; and
controlling the DGE to perform, based on the adjusted attenuation spectrum, power attenuation processing on signals of different wavelengths in an optical signal output by the first-stage optical amplifier system.

16. The method of claim 15, wherein the at least two gain modes comprise a first gain mode and a second gain mode, and wherein the method further comprises:
controlling, when the optical amplifier is in the first gain mode, a first input port of the optical switch to be coupled to a first output port of the optical switch to enable the input optical signal to sequentially flow through the first-stage optical amplifier system, the DGE, the optical switch, the second-stage optical amplifier system, and a coupler of the optical amplifier and then to output from the optical amplifier; and
controlling, when the optical amplifier is in the second gain mode, the first input port to be coupled to a second output port of the optical switch to enable the input optical signal to sequentially flow through the first-stage optical amplifier system, the DGE, the optical switch, and the coupler and then to output from the optical amplifier.

17. The method of claim 15, wherein the at least two gain modes comprise a first gain mode, a second gain mode, and a third gain mode, and wherein the method further comprises:
controlling, when the optical amplifier is in the first gain mode, a first input port of a first optical switch of the optical amplifier to be coupled to a first output port of the first optical switch, a second input port of the first optical switch to be coupled to a second output port of the first optical switch, a third input port of a second optical switch of the optical amplifier to be coupled to a third output port of the second optical switch, and a fourth input port of the second optical switch to be coupled to a fourth output port of the second optical switch to enable the input optical signal to sequentially flow through the first-stage optical amplifier system, the DGE, the first optical switch, the second-stage optical amplifier system, and the second optical switch and then to output from the optical amplifier;
controlling, when the optical amplifier is in the second gain mode, the first input port to be coupled to the second output port and the fourth input port to be coupled to the third output port to enable the input optical signal to sequentially flow through the first-stage optical amplifier system, the DGE, the first optical switch, a third-stage optical amplifier system of the at least two stages of optical amplifier systems, and the second optical switch and then to output from the optical amplifier; and
controlling, when the optical amplifier is in the third gain mode, the first input port to be coupled to the first output port, the second input port to be coupled to the second output port, the third input port to be coupled to the fourth output port, and the fourth input port to be coupled to the third output port to enable the input optical signal to sequentially flow through the first-stage optical amplifier system, the DGE, the first optical switch, the second-stage optical amplifier system, the second optical switch, the third-stage optical amplifier system, and the second optical switch and then to output from the optical amplifier.

18. The method of claim 15, further comprising:
obtaining input port data of the optical amplifier and output port data of the optical amplifier; and
further adjusting the attenuation spectrum based on the input port data and the output port data.

19. The method of claim 15, further comprising:
obtaining input port data of the optical amplifier; and
further adjusting the attenuation spectrum based on the input port data.

20. The method of claim 15, further comprising:
obtaining output port data of the optical amplifier; and
further adjusting the attenuation spectrum based on the output port data.

* * * * *